(12) United States Patent
Shirai et al.

(10) Patent No.: US 7,826,128 B2
(45) Date of Patent: Nov. 2, 2010

(54) PROJECTION DISPLAY SYSTEM WITH VARYING LIGHT SOURCE

(75) Inventors: Akira Shirai, Hino (JP); Hirokazu Nishino, Akishima (JP); Yoshiaki Horikawa, Hachioji (JP); Fusao Ishii, Menlo Park, CA (US)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 155 days.

(21) Appl. No.: 12/231,708

(22) Filed: Sep. 4, 2008

(65) Prior Publication Data
US 2009/0231669 A1 Sep. 17, 2009

Related U.S. Application Data

(63) Continuation-in-part of application No. 11/136,041, filed on May 23, 2005, now Pat. No. 7,304,783, and a continuation-in-part of application No. 11/183,216, filed on Jul. 16, 2005, now Pat. No. 7,215,460.

(60) Provisional application No. 60/967,879, filed on Sep. 6, 2007.

(51) Int. Cl.
G02B 26/00 (2006.01)
(52) U.S. Cl. .................. 359/291; 359/290; 359/223
(58) Field of Classification Search ............... 359/290, 359/291; 353/31, 33, 34, 84; 349/5
See application file for complete search history.

(56) References Cited

U.S. PATENT DOCUMENTS

| | | | |
|---|---|---|---|
| 4,229,732 A | 10/1980 | Hartstein | |
| 4,662,746 A | 5/1987 | Hornbeck | |
| 5,214,420 A | 5/1993 | Thompson et al. | |
| 5,285,407 A | 2/1994 | Gale | |
| 5,583,688 A | 12/1996 | Hornbeck | |
| 6,198,180 B1 | 3/2001 | Garcia | |
| 6,992,810 B2 | 1/2006 | Pan | |
| 2004/0239880 A1 | 12/2004 | Kapellner | |
| 2005/0030479 A1 | 2/2005 | Aruga | |
| 2005/0128436 A1 | 6/2005 | Matsui | |
| 2005/0190429 A1 | 9/2005 | Ishii | |
| 2006/0018025 A1 | 1/2006 | Sharon et al. | |
| 2006/0152690 A1 | 7/2006 | DiCarlo | |
| 2007/0132681 A1* | 6/2007 | Chen | 345/85 |
| 2007/0153235 A1 | 7/2007 | Morikawa et al. | |
| 2008/0012805 A1* | 1/2008 | Duncan et al. | 345/84 |

* cited by examiner

Primary Examiner—Timothy J Thompson
(74) Attorney, Agent, or Firm—Bo-In Lin

(57) ABSTRACT

The present invention provides a projection apparatus, comprising: a light source for emitting illumination light; at least one spatial light modulator with a plurality of movable mirrors corresponding to pixels to be displayed, for performing a modulation of the illumination light through operation of the movable mirrors; a light source control unit performing a modulation control of the light source; and a spatial light modulator control unit generating, from an input image signal, a control signal for driving the spatial light modulator, wherein: the light source control unit adjusts a pulse emission frequency of an emission pulse of the illumination light emitted from the light source while corresponding to an oscillation frequency of the movable mirrors.

32 Claims, 31 Drawing Sheets

US 7,826,128 B2

PROJECTION DISPLAY SYSTEM WITH VARYING LIGHT SOURCE

This application is a Non-provisional Application claiming a Priority date of Sep. 6, 2007 based on a previously filed Provisional Application 60/967,879 and a Non-provisional patent application Ser. No. 12/009,389 filed on Jan. 17, 2008 for the Provisional Patent Application 60/930,151, and another Non-provisional application Ser. No. 10/698,620 filed on Nov. 1, 2003. The Non-provisional patent application Ser. No. 12/009,389. The Provisional Application 60/930,151 is a Continuation in Part (CIP) Application of another U.S. patents application Ser. No. 10/918,677 filed on Aug. 14, 2004 and now issued into U.S. Pat. No. 7,183,618. The disclosures made in these Patent Applications filed by the same Applicant of this Non-Provisional Application are hereby incorporated by reference in this Patent Application. This Application is further a Continuation-in-Part Application of two previously filed application Ser. Nos. 11/136,041 filed on May 23, 2005 (now issued into U.S. Pat. No. 7,304,783) and 11/183,216 filed on Jul. 16, 2005 (now issued into U.S. Pat. No. 7,215,460). The disclosures made in these Applications as filed by the same Application of this Application are further incorporated by reference.

BACKGROUND OF THE INVENTION

1. Field of the Invention

The present invention relates to system configurations and control methods for image projection apparatus implemented with a spatial light modulator (SLM). More particularly this invention relates to image projection system implemented with a spatial light modulator and adjustable varying light source to operate synchronously with the spatial light modulator to provide images with improved display qualities.

2. Description of the Related Art

Even though there have been significant advances made in recent years on the technologies of implementing electromechanical micromirror devices as spatial light modulator, there are still limitations and difficulties when these are employed to provide high quality image displays.

Specifically, when the display image is digitally controlled, the image qualities are adversely affected due to the fact that the image is not displayed with a sufficient number of gray scales.

Electromechanical micromirror devices have drawn considerable interest because of their application as spatial light modulators (SLMs). A spatial light modulator requires an array of relatively large number of micromirror devices. In general, the number of devices required ranges from 60,000 to several million for each SLM. Referring to FIG. 1A for a digital video system 1, disclosed in U.S. Pat. No. 5,214,420, that includes a display screen 2. A light source 10 is used to generate an illumination light for the ultimate illumination for displaying images on the display screen 2. Light 9 generated is further concentrated and directed toward lens 12 by mirror 11. Lens 12, 13 and 14 form a beam columnator to columnate light 9 into a column of light 8. A spatial light modulator 15 is controlled by a computer through data transmitted over data cable 18 to selectively redirect a portion of the light from path 7 toward lens 5 to display on screen 2. As shown in FIG. 1B, the SLM 15 has a surface 16 that includes an array of switchable reflective elements, e.g., micromirror devices 32, such as elements 17, 27, 37, and 47 as reflective elements attached to a hinge 30. When element 17 is controlled in to operate along an ON-state position, a portion of the light from path 7 is redirected along path 6 to lens 5, where it is enlarged or spread along path 4 to impinge onto the display screen 2, so as to form an illuminated pixel 3. When element 17 is controlled to operate in an OFF-state position, the light is redirected away from the display screen 2 and hence the pixel 3 remains dark.

The on-and-off states of the micromirror control scheme, as that implemented in the U.S. Pat. No. 5,214,420 and by most of the conventional display systems, impose a limitation on the quality of the display. Specifically, in a conventional configuration of the control circuit, the gray scale (PWM between ON and OFF states) is limited by the LSB (least significant bit, or the least pulse width). Due to the on-off states implemented in the conventional systems, there is no way to provide a shorter pulse width than LSB. The least brightness, which determines gray scale, is the light reflected during the least pulse width. The limited gray scales lead to degradations of image display.

Specifically, FIG. 1C exemplifies a conventional circuit diagram of a control circuit for a micromirror, according to U.S. Pat. No. 5,285,407. The control circuit includes memory cell 32. Various transistors are referred to as "M*" where * designates a transistor number and each transistor is an insulated gate field effect transistor. Transistors M5, and M7 are p-channel transistors; transistors M6, M8, and M9 are n-channel transistors. The capacitances, C1 and C2, represent the capacitive loads of the memory cell 32. Memory cell 32 includes an access switch transistor M9 and a latch 32a according to the basic static random access switch memory (SRAM) design. All access transistors M9 in a row receive a DATA signal from a different bit-line 31a. In order to access and write to a particular memory cell 32, a controller uses the row signal functioning as a word line to turn on an appropriate row select transistor M9. Latch 32a is formed from two cross-coupled inverters, M5/M6 and M7/M8, which permit two stable states. State 1 is Node A high and Node B low, and state 2 is Node A low and Node B high.

FIG. 1A shows a dual states switching with the control circuit controls the micromirrors to position either at an ON or an OFF orientation. The brightness, i.e., the gray scales of display for a digitally control image system, is determined by the length of time the micromirror stays at an ON position. The length of time a micromirror is controlled at an ON position is in turned controlled by a multiple bit word. For simplicity of illustration, FIG. 1D shows the "binary time intervals" when controlled by a four-bit word. As shown in FIG. 1D, the time durations have relative values of 1, 2, 4, 8 that in turn define the relative brightness for each of the four bits, where 1 is for the least significant bit and 8 is for the most significant bit. According to the control mechanism as shown, the minimum controllable difference between gray scales is a brightness represented by a "least significant bit" that maintains the micromirror at an ON position.

In a simple exemplary display system operated with an n bits brightness control signal for controlling the gray scales, the frame time is divided into $2^n-1$ equal time slices. For a 16.7 milliseconds frame period and n-bit intensity values, the time slice is $16.7/(2^n-1)$ milliseconds Having established these time slices for controlling the length of time for displaying each pixel in each frame, the pixel intensities are determined by the number of time slices represented by each bit. Specifically, a display of a black pixel is represented by 0 time slices. The intensity level represented by the LSB is 1 time slice, and maximum brightness is $2^n-1$ time slices. The number time slices that a micro mirror is controlled to operate at an On-state in a frame period determines a specifically quantified light intensity of each pixel corresponding to the micromirror reflecting a modulated light to that pixel. Thus, during a frame period, each pixel corresponding to a modulated micromirror controlled by a control word with a quantified value of more than 0 is operated at an on state for the number of time slices that correspond to the quantified value represented by the control word. The viewer's eye integrates the pixels' brightness so that the image appears the same as if it were generated with analog levels of light.

For addressing deformable mirror devices, a pulse width modulator (PWM) receives the data formatted into "bit-planes". Each bit-plane corresponds to a bit weight of the intensity value. Thus, if each pixel's intensity is represented by an n-bit value, each frame of data has n bit-planes. Each bit-plane has a 0 or 1 value for each display element. In the example described in the preceding paragraphs, each bit-plane is separately loaded during a frame. The display elements are addressed according to their associated bit-plane values. For example, the bit-plane representing the LSBs of each pixel is displayed for 1 time slice.

Projection apparatuses such as described above generally use a light source such as a high-pressure mercury lamp such as a xenon lamp, or similar kinds of light sources. However, these types of light sources perform poorly in high-speed switching that alternates between the ON and OFF states. Accordingly, a light source is usually controlled to continuously operate in an ON state during the entire length of time when the projection apparatus is in operation. The light source that is continuously turned on generates a large amount of heat and wastes light and electricity.

There is also an increasing demand that projection apparatuses project images at a higher level of gray scale (gradation). Accordingly, a spatial light modulator has to be controlled to enable a projection apparatus to project images at a higher level of gray scale. However, the achievable improvement of the gray scale performance would be very limited if the improvements are to be achieved only through the control of the spatial light modulator. Some of the attempts to further improve the quality of image display have been disclosed in many patents, such as U.S. Pat. Nos. 5,214,420, 5,285,407, and published patent Applications. However, the disclosures including those included in the Information Disclosure Statement (IDS) have not provided effective solution to resolve the above discussed difficulties and limitations.

SUMMARY OF THE INVENTION

It is an exemplary embodiment of the present invention to provide an image projection system with an improved light source synchronously working with a spatial light modulator (SLM) to reduce heat generation and electric power consumption.

It is another exemplary embodiment of the present invention to provide an image projection system with an improved light source synchronously working with a spatial light modulator (SLM) to realize various and high performance display gray scale without being limited by the display gray scale performance of a spatial light modulator.

Briefly, an exemplary embodiment of the present invention provides a projection apparatus, comprising a light source for emitting illumination light, at least one spatial light modulator with a plurality of movable mirrors corresponding to pixels to be displayed, for performing a modulation of the illumination light through operation of the movable mirrors, a light source control unit performing a modulation control of the light source, and a spatial light modulator control unit generating, from an input image signal, a control signal for driving the spatial light modulator, wherein the light source control unit adjusts a pulse emission frequency of an emission pulse of the illumination light emitted from the light source while corresponding to an oscillation frequency of the movable mirrors.

Another exemplary embodiment of the present invention discloses a projection apparatus, wherein the pulse emission frequency of the illumination light emitted from the light source is ten times the oscillation frequency of the movable mirrors or higher.

Another exemplary embodiment of the present invention discloses a projection apparatus, wherein the pulse emission frequency of the illumination light emitted from the light source is one-tenth the oscillation frequency of the movable mirrors or lower.

Another exemplary embodiment of the present invention discloses a projection apparatus, wherein the light source control unit drives the light source so as to change a pulse width of the emission pulse.

A fifth exemplary embodiment of the present invention provides the projection apparatus according to the first exemplary embodiment, wherein the light source control unit drives the light source so as to change a pulse intensity of the emission pulse.

A sixth exemplary embodiment of the present invention provides the projection apparatus according to the first exemplary embodiment, wherein the light source is a laser diode or a light emitting diode (LED).

Another exemplary embodiment of the present invention discloses a projection apparatus, wherein the movable mirrors have an ON state of reflecting, to a projection optical system, the illumination light emitted from the light source, an OFF state of reflecting the illumination light to a position that is offset from the projection optical system, and an oscillation state in which the movable mirrors oscillate between the ON state and the OFF state.

Another exemplary embodiment of the present invention discloses a projection apparatus, wherein the light source control unit performs a control so as to stop emission of the light source during a period other than a period during which the control signal generated by the spatial light modulator control unit drives the spatial light modulator.

Another exemplary embodiment of the present invention discloses a projection apparatus, wherein a plurality of the light sources respectively corresponding to at least red (R), green (G), and blue (B), wherein the light source control unit independently drives the light sources of R/G/B.

Another exemplary embodiment of the present invention discloses a projection apparatus, wherein the light sources of at least red (R) green (G), and blue (B), wherein the light source control unit performs a drive so that the spatial light modulator control unit adjusts an emission intensity of the illumination light for the light source of each of R/G/B synchronously with the control signal generated by the spatial light modulator control unit.

Another exemplary embodiment of the present invention discloses a projection apparatus, wherein a plurality of the spatial light modulators, wherein the spatial light modulator control unit generates the control signal for driving the plurality of spatial light modulators; and the light source control unit receives the control signal for driving each of the spatial light modulators, and adjusts an emission intensity of the illumination light emitted from the light sources to the spatial light modulators.

Another exemplary embodiment of the present invention discloses a projection apparatus, wherein a light source for emitting illumination light, at least one spatial light modulator with a plurality of movable mirrors corresponding to pixels to be displayed, for performing a modulation of the illumination light through operation of the movable mirrors, a light source control unit performing a modulation control of the light source, and a spatial light modulator control unit generating, from an input image signal, a control signal for driving the spatial light modulator, wherein the light source control unit controls a pulse emission frequency of an emission pulse of the illumination light emitted from the light source so that the pulse emission frequency is ten times an oscillation frequency of the movable mirrors or higher.

Another exemplary embodiment of the present invention discloses a projection apparatus, wherein the light source control unit drives the light source so as to change a pulse width of the emission pulse.

Another exemplary embodiment of the present invention discloses a projection apparatus, wherein the light source control unit drives the light source so as to change a pulse intensity of the emission pulse.

Another exemplary embodiment of the present invention discloses a projection apparatus, wherein the light source is a laser diode or a light emitting diode (LED).

Another exemplary embodiment of the present invention discloses a projection apparatus, wherein the movable mirrors have an ON state of reflecting, to a projection optical system, the illumination light emitted from the light source, an OFF state of reflecting the illumination light to a position that is offset from the projection optical system, and an oscillation state in which the movable mirrors oscillate between the ON state and the OFF state.

Another exemplary embodiment of the present invention discloses a projection apparatus, wherein a light source for emitting illumination light, at least one spatial light modulator with a plurality of movable mirrors corresponding to pixels to be displayed, for performing a modulation of the illumination light through operation of the movable mirrors, a light source control unit performing a modulation control of the light source; and a spatial light modulator control unit generating, from an input image signal, a control signal for driving the spatial light modulator, wherein the light source control unit controls a pulse emission frequency of an emission pulse of the illumination light emitted from the light source so that the pulse emission frequency is one-tenth an oscillation frequency of the movable mirrors or lower.

Another exemplary embodiment of the present invention discloses a projection apparatus, wherein the light source control unit drives the light source so as to change a pulse width of the emission pulse.

Another exemplary embodiment of the present invention discloses a projection apparatus, wherein the light source control unit drives the light source so as to change a pulse intensity of the emission pulse.

Another exemplary embodiment of the present invention discloses a projection apparatus, wherein the light source is a laser diode or a light emitting diode (LED).

Another exemplary embodiment of the present invention discloses a projection apparatus, wherein the movable mirrors have an ON state of reflecting, to a projection optical system, the illumination light emitted from the light source, an OFF state of reflecting the illumination light to a position that is offset from the projection optical system, and an oscillation state in which the movable mirrors oscillate between the ON state and the OFF state.

BRIEF DESCRIPTION OF THE DRAWINGS

The present invention is described in detail below with reference to the following figures.

FIG. 5A is a side cross sectional view for showing an example of a deflection state when the mirror is ON;

DESCRIPTION OF THE PREFERRED EMBODIMENTS

Hereinafter, preferred embodiments of the present invention will be explained by referring to <<Disclosure Contents>> provided below.

Disclosure Content 1

Preferred Embodiment 1-1

The preferred embodiment 1-1 of the present invention relates to a mirror device configured by arranging a plurality of deflectable mirrors as two-dimensional arrays on a substrate and specifically to a method for controlling the deflection angle of a mirror.

Figure 1A:
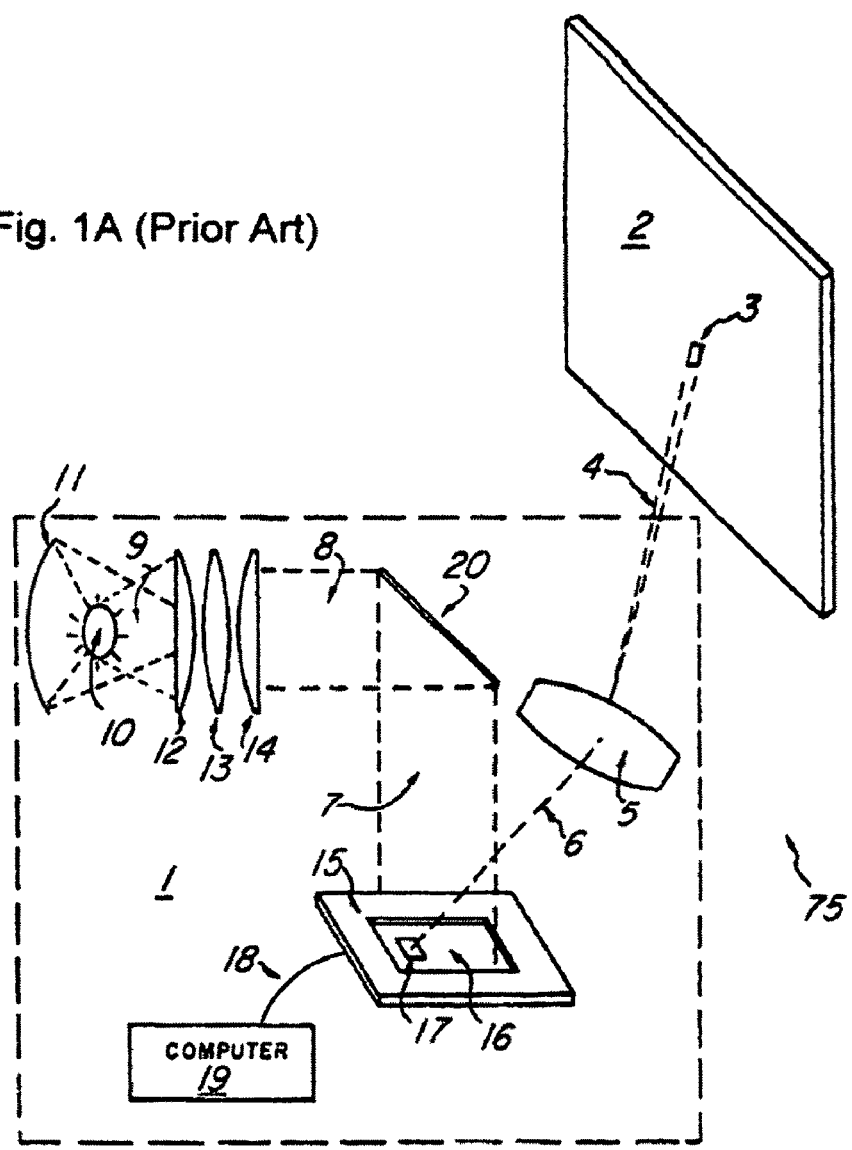
FIG. 1A is a functional block diagram showing the configuration of a projection apparatus according to a conventional technique.
Figure 1B:
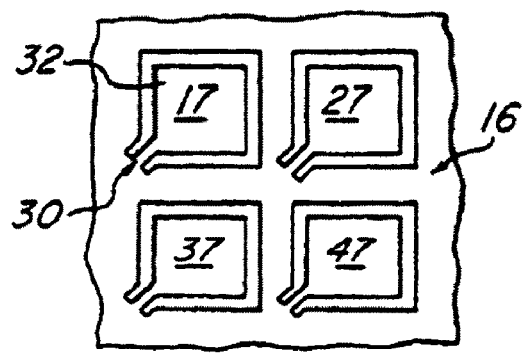
FIG. 1B is a to view for showing the configuration of a mirror element of the projection apparatus according to a conventional technique.
Figure 1C:
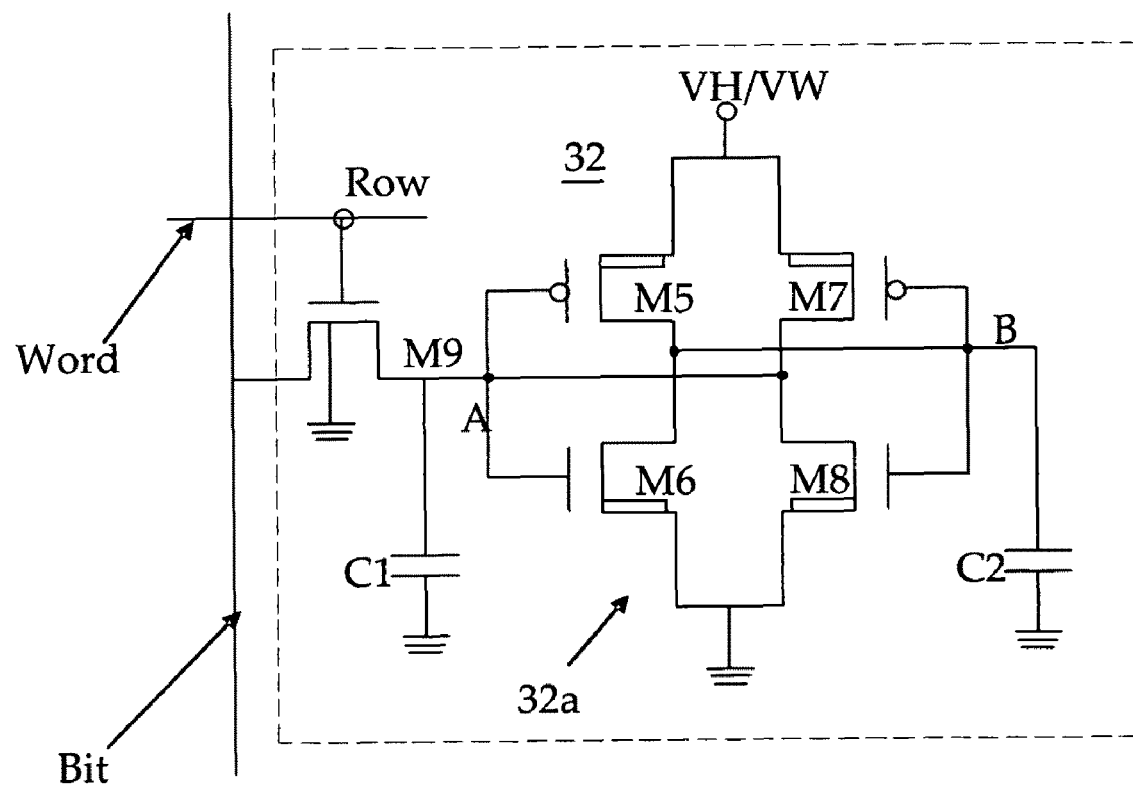
FIG. 1C is a circuit diagram showing the configuration of the drive circuit of a mirror element of the projection apparatus according to a conventional technique.
Figure 1D:
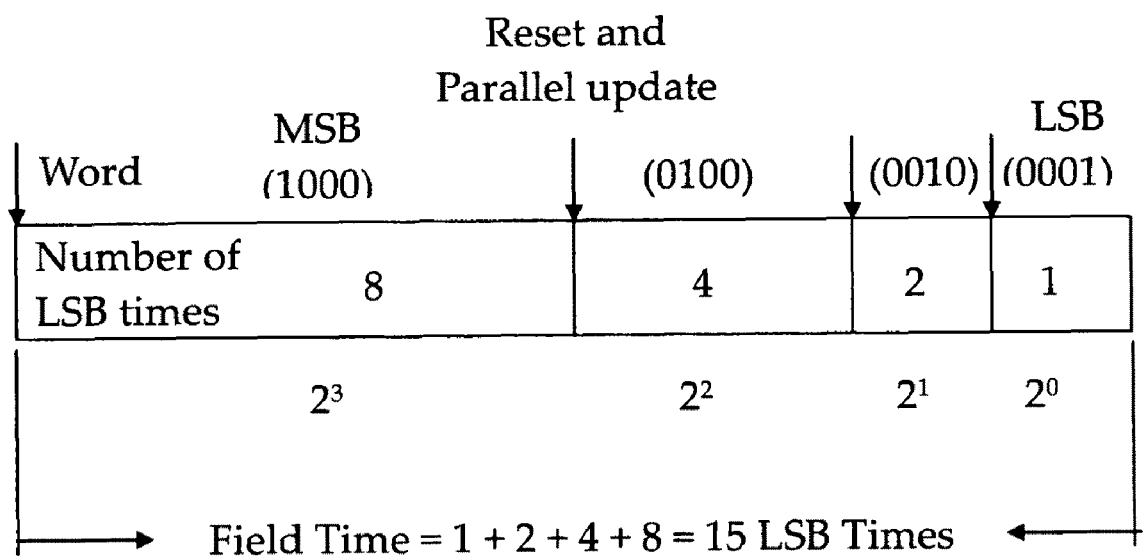
FIG. 1D is a timing diagram showing the format of image data used in the projection apparatus according to a conventional technique.
Figure 1E:
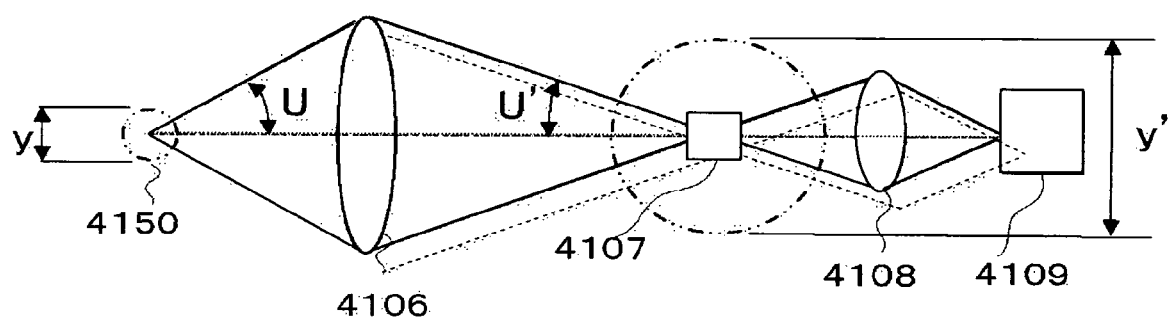
FIG. 1E is a side cross sectional view for illustrating the etendue by exemplifying the case of using a discharge lamp light source and projecting an image by way of an optical device.

FIG. 1E is cross sectional view for showing the etendue of a light projecting system using a discharge lamp as the light source to project an image through an optical device.

Outline of the Device

Image projection apparatuses implemented with a spatial light modulator (SLM), such as a transmissive liquid crystal, a reflective liquid crystal, a mirror array and other similar image modulation devices, are widely known.

A spatial light modulator is formed as a two-dimensional array of optical elements, ranging from tens of thousands to millions of miniature modulation elements, with the individual elements enlarged and displayed as the individual pixels corresponding to an image to be displayed onto a screen by way of a projection lens.

Spatial light modulators generally used for projection apparatuses primarily include two types: 1.) a liquid crystal device, formed by sealing a liquid crystal between transparent substrates, for modulating the polarizing direction of incident light by providing them with a potential, and 2.) a mirror device deflecting miniature micro electro mechanical systems (MEMS) mirrors with electrostatic force and controlling the reflecting direction of illumination light.

One embodiment of the above described mirror device is disclosed in U.S. Pat. No. 4,229,732, in which a drive circuit using MOSFET and deflectable metallic mirrors are formed on a semiconductor wafer substrate. The mirror can be deformed by electrostatic force supplied from the drive circuit and is capable of changing the reflecting direction of the incident light.

Meanwhile, U.S. Pat. No. 4,662,746 has disclosed an embodiment in which one or two elastic hinges retain a mirror. If the mirror is retained by one elastic hinge, the elastic hinge functions as a bending spring. If the mirror is retained by two elastic hinges, they function as torsion springs to incline the mirror and thereby the reflecting direction of the incident light.

As described above, the on-and-off states of the micromirror control scheme as that implemented in the U.S. Pat. No. 5,214,420 and by most of the conventional display systems impose a limitation on the quality of the display. Specifically, in conventional configurations of control circuits, the gray scale (PWM between ON and OFF states) is limited by the LSB (least significant bit, or the least pulse width). Due to the on-off states implemented in the conventional systems, there is no way to provide a shorter pulse width than LSB. The least amount of controllable brightness, which determines gray scale, is the light reflected during the least pulse width. The limited gray scales lead to degradations of image display.

Specifically, FIG. 1C exemplifies a conventional circuit diagram of a control circuit for a micromirror according to U.S. Pat. No. 5,285,407. The control circuit includes memory cell 32. Various transistors are referred to as "M*" where * designates a transistor number and each transistor is an insulated gate field effect transistor. Transistors M5, and M7 are p-channel transistors; transistors M6, M8, and M9 are n-channel transistors. The capacitances, C1 and C2, represent the capacitive loads of the memory cell 32. Memory cell 32 includes an access switch transistor M9 and a latch 32a, which is the basis of the static random access switch memory (SRAM) design. All access transistors M9 in a row receive a DATA signal from a different bit-line 31a. The particular memory cell 32 is accessed and written by turning on the appropriate row select transistor M9, using the ROW signal functioning as a wordline. Latch 32*a* is formed from two cross-coupled inverters, M5/M6 and M7/M8, which permit two stable states. State 1 is Node A high and Node B low and state 2 is Node A low and Node B high.

The mirror driven by a drive electrode abuts a landing electrode is structured differently from the drive electrode, and thereby a prescribed tilt angle is maintained. A "landing chip", which possesses a spring property, is formed on the point of contact between the landing electrode and the mirror. This configuration enhances the deflection of the mirror to the reverse direction upon a change in the control. The parts forming the landing chip and the landing electrode are maintained at the same potential so that contact will not cause a shorting or other similar disruption.

Outline of PWM Control

As described above, switching between the dual states, as illustrated by the control circuit, controls the micromirrors to position either at an ON or an OFF angle, as shown in FIG. 1A. The brightness, i.e., the gray scales of display for a digitally control image system, is determined by the length of time the micromirror stays at an ON position. The length of time a micromirror is controlled at an ON position is in turned controlled by a multiple bit word. For simplicity of illustration, FIG. 1D shows the "binary time intervals" when controlled by a four-bit word. As shown in FIG. 1D, the time durations have relative values of 1, 2, 4, 8 that in turn define the relative brightness for each of the four bits, where 1 is for the least significant bit and 8 is for the most significant bit. According to the control mechanism shown, the minimum controllable difference between gray scales is a brightness represented by a "least significant bit" that maintains the micromirror at an ON position.

In a simple exemplary display system operated with a n bits brightness control signal for controlling the gray scales, the frame time is divided into $2^n-1$ equal time slices. For a 16.7 milliseconds frame period and n-bit intensity values, the time slice is $16.7/(2^n-1)$ milliseconds.

Having established these time slices for controlling the length of time for displaying each pixel in each frame, the pixel intensities are determined by the number of time slices represented by each bit. Specifically, a display of a black pixel is represented by 0 time slices. The intensity level represented by the LSB is 1 time slice, and maximum brightness is $2^n-1$ time slices. The number time slices that a micro mirror is controlled to operate at an On-state in a frame period determines a specifically quantified light intensity of each pixel corresponding to the micromirror reflecting a modulated light to that pixel. Thus, during a frame period, each pixel corresponding to a modulated micromirror controlled by a control word with a quantified value of more than 0 is operated at an on state for the number of time slices that correspond to the quantified value represented by the control word. The viewer's eye integrates the pixels' brightness so that the image appears the same as if it were generated with analog levels of light. For addressing deformable mirror devices, a pulse width modulator (PWM) receives the data formatted into "bit-planes". Each bit-plane corresponds to a bit weight of the intensity value. Thus, if each pixel's intensity is represented by an n-bit value, each frame of data has n bit-planes. Each bit-plane has a 0 or 1 value for each display element. In the example described in the preceding paragraphs, each bit-plane is separately loaded during a frame. The display elements are addressed according to their associated bit-plane values. For example, the bit-plane representing the LSBs of each pixel is displayed for 1 time slice.

Outlines of Mirror Size and Resolution

The size of a mirror for constituting such a mirror device is between 4 µm and 20 µm on each side. The mirrors are placed on a semiconductor wafer substrate in such a manner as to minimize the gap between adjacent mirrors. Smaller gaps reduce random and interfering reflection lights from the gap to prevent such reflections from degrading the contrast of the displayed images. The mirror device is formed a substrate that includes an appropriate number of mirror elements. Each mirror element is applied to modulate a corresponding image display element known as a pixel. The appropriate number of image display elements is determined according to image display standards in compliance to the resolution of a display specified by the Video Electronics Standards Association (VESA) and to the television-broadcasting standard. For example, in the case of configuring a mirror device in compliance with the WXGA (with the resolution of 1280×768) as specified by VESA and in which the size of each mirror is 10 µm, the diagonal length of the display area will be about 0.61 inches, thus producing a sufficiently small mirror device Outline of Projection Apparatus Projection apparatuses using deflection-type ("deflectable") light modulators are primarily categorized into two types: 1.) a single-panel projection apparatus comprised of a single spatial light modulator, changing spatially the frequency of a projection light and displaying a color image, and 2.) a multi-panel projection apparatus comprised of a plurality of spatial light modulators, constantly modulating an illumination light with different frequencies by means of the individual spatial light modulators and displaying a color image by synthesizing these modulated lights.

The single-panel projection apparatus is configured as described above in reference to FIG. 1A.

Outline of the Introduction of Laser Light Source

Figure 2:
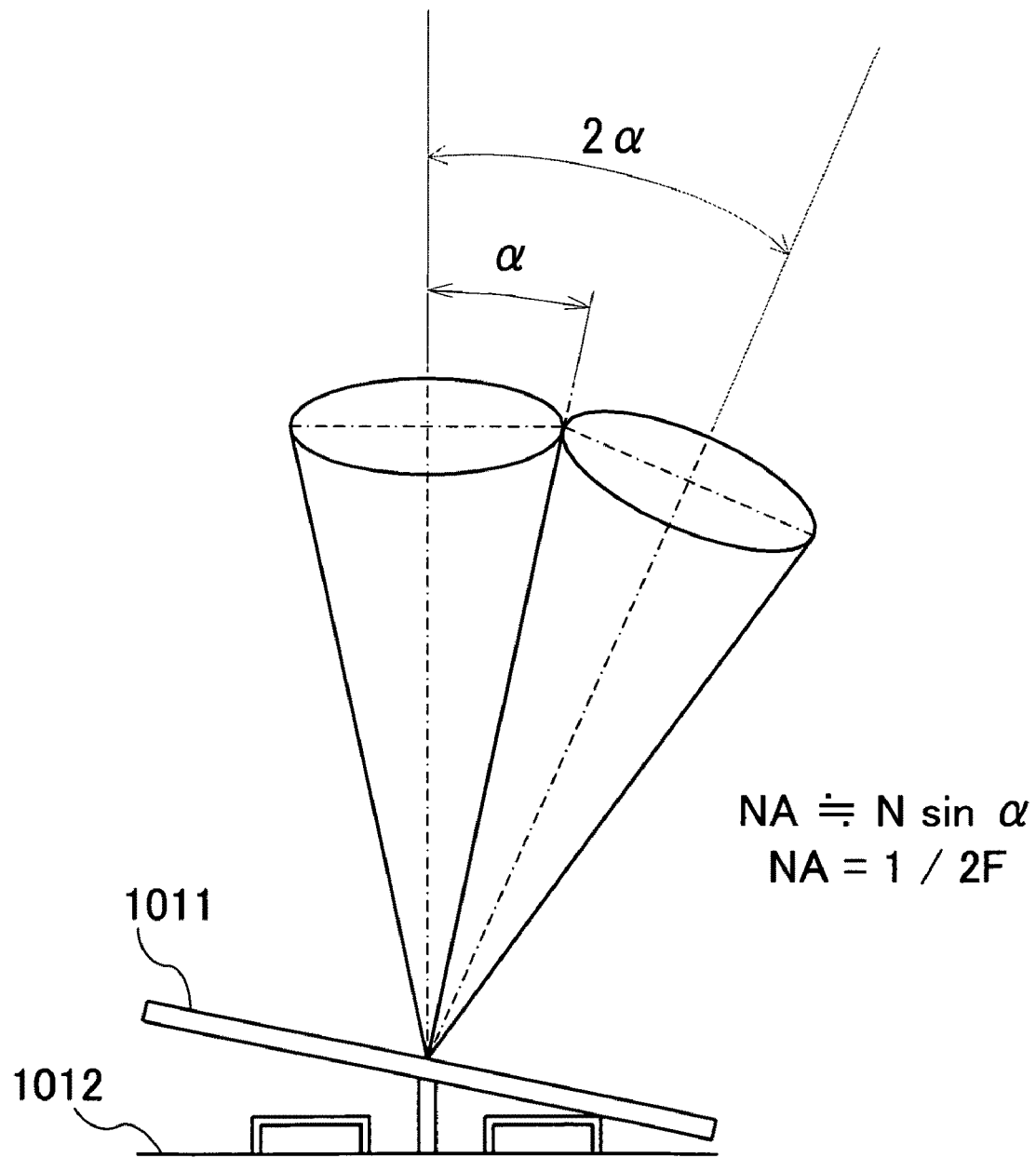
FIG. 2 is a side cross sectional view for showing the relationship among the numerical aperture NA1 of an illumination light path, the numerical aperture NA2 of a projection light path and the tilt angle α of a mirror.

In the projection apparatus comprising a reflective spatial light modulator represented by the above described mirror, there is a close relationship among the numerical aperture (NA) NA1 of an illumination light path, the numerical aperture NA2 of a projection light path, and the tilt angle α of a mirror. FIG. 2 shows the relationship among them.

Assuming that the tilt angle α of a mirror 1011 is 12 degrees, when a modulated light reflected by the mirror 1011 and incident to the pupil of the projection light path is set perpendicular to a device substrate 1012, the illumination light is incident at an angle 2α, that is, 24 degrees, relative to the perpendicular axis of the device substrate 1012. For the light beam reflected by the mirror to be most efficiently incident to the pupil of the projection lens, it is desirable for the numerical aperture of the projection light path to be equal to the numerical aperture of the illumination light path. If the numerical aperture of the projection light path is smaller than that of the illumination light path, the illumination light cannot be sufficiently transmitted into the projection light path. On the other hand, if the numerical aperture of the projection light path is larger than that of the illumination light path, the illumination light can be entirely transmitted (?), but then the projection lens becomes unnecessarily large, which increases the inconvenience in terms of configuring the projection apparatus. Furthermore, in this case, the light fluxes of the illumination light and projection light must be directed apart from each other because the optical members of the illumination system and those of the projection system must be physically placed in separate locations in an image display system. Based on these considerations, a spatial light modulator with a mirror tilt angle of 12 degrees, the numerical aperture (NA) NA1 of the illumination light path and the numerical aperture NA2 of the projection light path are preferably set as follows:

$$NA1=NA2=\sin\alpha=\sin 12°$$

Letting the F-number of the illumination light path be F1 and the F-number of the projection light path be F2, the numerical aperture can be converted into an F-number as follows:

$$F1=F2=1/(2*NA)=1/(2*\sin 12°)=2.4$$

In order to maximize the projection of illumination light emitted from a non-polarizing light source in the emission direction of light, such as a high-pressure mercury lamp or xenon lamp, which are generally used for a projection apparatus, its' necessary to maximize the projecting angle of light onto the cross sectional surface of the light path of the illumination light. Since the numerical aperture of the illumination light path is determined by the specification of the tilt angle of the mirror, the tilt angle of the mirror must be increased in order to increase the numerical aperture of the illumination light path.

However, there is a technical difficulty associated with a configuration by increasing the tilt angle of the mirror due to a fact that such system requires a higher drive voltage to drive the mirror.

A greater tilt angle of the mirror requires greater space for tilting the mirror that leads to a greater distance between the mirror and an electrode for driving the mirror. The electrostatic force F generated between the mirror and the electrode is derived by the following equation:

$$F=(\in *S*V^2)/(2*d^2),$$

where "S" is the area size of the electrode, "V" is the voltage, "d" is the distance between the electrode and mirror and "∈" is the permittivity of vacuum.

The equation clearly illustrates that the drive force is decreased in proportion to the square of the distance d between the electrode and mirror. It is possible to increase the drive voltage in order to compensate for the decrease in the drive force associated with the increase in the distance. However, for conventional system the drive voltage is about 3 to 15 volts in the drive circuit by means of a CMOS process used for driving a mirror, and therefore, a relatively special process such as a DMOS process is required if a drive voltage in excess of about 15 volts is needed. A DMOS process would greatly increase the cost of a mirror device and hence, is undesirable.

Further, with an eye towards cost reduction, it is desirable to obtain as many mirror devices as possible from a single semiconductor wafer substrate in order to boost productivity. Therefore, shrinking the size of mirror elements reduces the size of the mirror device. It is clear that the area size of an electrode would also be reduced with the shrinking of the mirror, which, in turn, leads to less driving power.

Furthermore, in contrast to the requirement for shrinking a mirror device, there is another tradeoff factor to be considered because the larger a mirror device, the brighter would be the display images when a conventional lamp is used. A conventional lamp emitting non-polarized light substantially reduces the efficiency of light energy. This is attributable to a relationship commonly called etendue.

As shown in FIG. 1E above, where "y" is the size of a light source, "u" is the importing angle of light on the light source side, "y'" is the size of the image of a light source, and "u'" is the converging angle on the image side, the relationship among these is represented by the following equation:

$$y*u=y'*u'$$

That is, the smaller the device in an image projection system for receiving a light projection from a light source, the smaller the projecting angle when the illumination light is projected from the light source. For this reason, in order to shrink a mirror device, it is advantageous to use a laser light source to project a coherent polarized light. Note that in FIG. 1E above, the numerical symbol 4150 denotes the light source, the numerical symbol 4106 denotes the illumination lens, the numerical symbol 4107 denotes the device, the numerical symbol 4108 denotes the projection lens, and the numerical symbol 4109 denotes the projected image.

Outline of Resolution Limit

The following discussions are based on an examination of the limit value of the aperture ratio of a projection lens used for a projection apparatus. The projection lens displays the image on a display surface by enlarging the image modulated with specific resolution and reflected from a spatial light modulator.

A symbol "Rp" denotes the pixel size of the spatial light modulator, "NA" represents the aperture ratio of a projection lens, "F" is an F number and "λ" is the wavelength of light, the limitative "Rp" with which any adjacent pixels on the projection surface are separately observed is derived by the following equation:

$$Rp=0.61*\lambda/NA=1.22*\lambda*F$$

The table below shows the F value of a projection lens and the deflection angle of a mirror by shrinking the mirror size that further shortens the distance between the adjacent mirror elements. The wavelength of light beam is designated at a value of λ=650 nm representing a lowest value within the range of visible light. Meanwhile, the F value of a projection lens with the wavelength designated at 700 nm is about 7% smaller than the F value for the wavelength of 650 nm.

| Pixel size of mirror device [μm] | F number of projection lens | Deflection angle of mirror [degrees] |
|---|---|---|
| 4 | 5.04 | 5.69 |
| 5 | 6.30 | 4.55 |
| 6 | 7.56 | 3.79 |
| 7 | 8.82 | 3.24 |
| 8 | 10.08 | 2.84 |
| 9 | 11.34 | 2.52 |
| 10 | 12.61 | 2.27 |
| 11 | 13.87 | 2.06 |

Therefore, since the difficulties related to the above described concerns with etendue is circumvented by using a laser light for the light source, the F numbers of lenses for the illumination system and projection system can be increased to the values shown in the table. Therefore, it is achievable to decrease the deflection angle of the mirror element, and thereby, a smaller mirror device with a low drive voltage can be configured.

Outline of Oscillation Control

Other than the method of minimizing the tilt angle of the mirror. US Patent Application 20050190429 discloses another method for reducing a drive voltage. A mirror is held in a free oscillation state in the inherent oscillation frequency, and thereby, the intensity of light that is about 25% to 37% of the emission light intensity when a mirror is controlled under a constant ON state can be obtained during the oscillation period of the mirror.

By controlling and operating the mirror with intermediate oscillation state, it is no longer required to drive the mirror in high speed. Furthermore, the intermediate oscillation states enable the projection of images with higher levels of gray scale. The mirror also has hinges that have a low spring constant as a spring member for supporting the mirror, and therefore enabling a reduction in the drive voltage. Furthermore, combining this technique with the method of decreasing the drive voltage by decreasing the deflection angle of the mirror, as described above, will increase the level of gray scale to a greater degree.

As described above, the use of a laser light source makes it possible to decrease the deflection angle of a mirror and also shrink the mirror device without decreasing the display brightness. Additionally, by implementing the above-described oscillation control method enables a higher level of gray scale without causing an increase in the drive voltage.

However, if an electrode for driving a mirror and a stopper for determining the deflection angle of the mirror are individually configured, as in the conventional method, the problem of inefficient space usage remains.

U.S. Pat. No. 5,583,688, US Patent 20060152690, U.S. Pat. No. 6,198,180, and U.S. Pat. No. 6,992,810 disclose configurations for determining a deflection angle of a mirror in a conventional mirror device. The above-disclosed configurations however have difficulties for a person of ordinary skill in the art to increase the size of address electrodes.

In consideration of the problems noted above, the preferred embodiment 1-1 of the present invention is accordingly configured to integrate the electrode used for driving a mirror element with the stopper used for determining the deflection angle of a mirror.

The following is a description, in detail, of a mirror device according to the present embodiment.

Figure 3A:
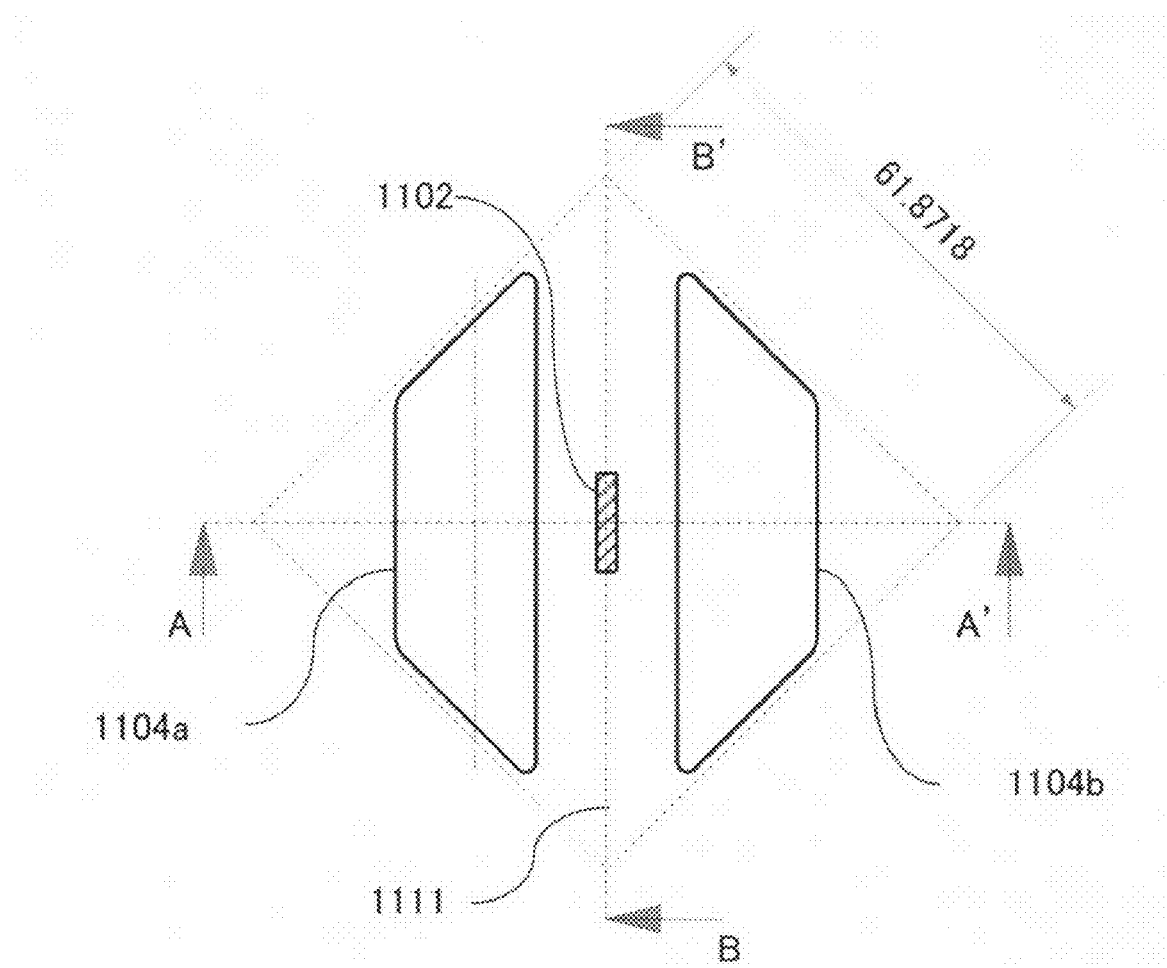
FIG. 3A is a cross-sectional view of a configuration of a mirror device according to the preferred embodiment 1-1.
Figure 3B:
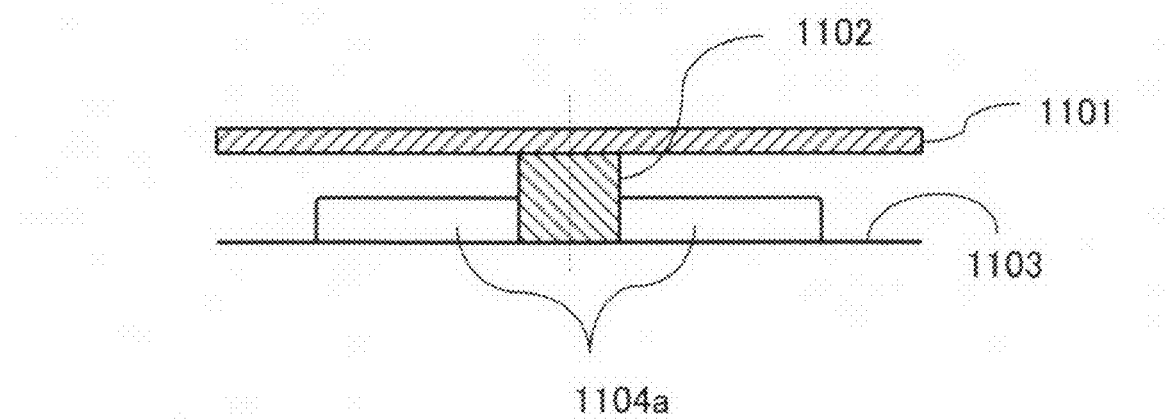
FIG. 3B is a cross-sectional view along line B-B' (shown in FIG. 3A) in a configuration example of a mirror element in the mirror device according to the preferred embodiment 1-1.
Figure 3C:
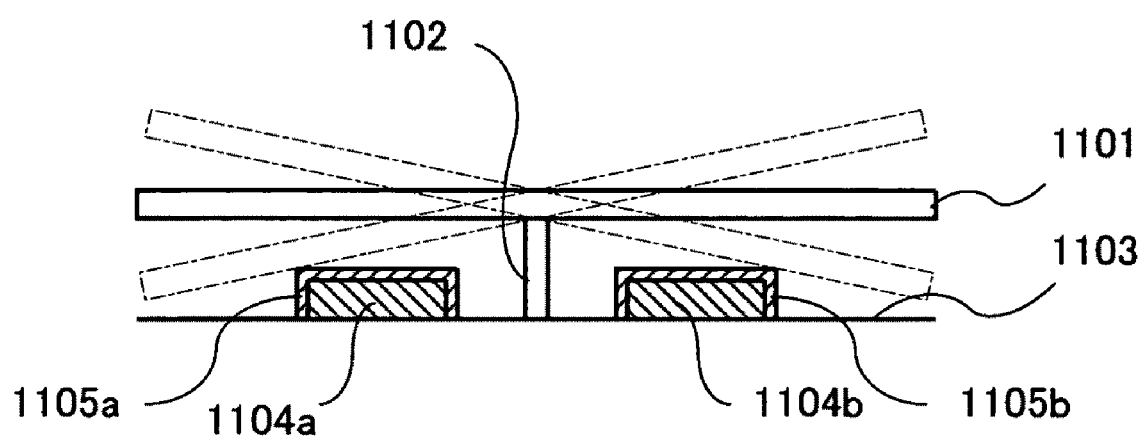
FIG. 3C is a cross-sectional view along line A-A' (shown in FIG. 3A) in a configuration example of the mirror element in the mirror device according to the preferred embodiment 1-1.

FIG. 3A is a top view of a mirror for illustrating the configuration of the mirror element of a mirror device according to the preferred embodiment 1-1. FIG. 3B is a side cross-sectional view for showing the configuration of the mirror element of the mirror device according to the preferred embodiment 1-1. FIG. 3C is another side cross-sectional view for showing the configuration of the mirror element of the mirror device according to the preferred embodiment of 1-1.

FIGS. 3A to 3C show a mirror element that includes a mirror 1101 having a highly reflective top surface coated with material, such as aluminum or gold. The mirror 1101 is supported by an elastic hinge 1102 made of a silicon material, a metallic material and the like, and is placed on a substrate 1103. The silicon material may include poly-silicon, single crystal silicon and amorphous silicon, while the metallic material may include aluminum, titanium, and an alloy of some of these metallic materials, or a composite of these metals or alloys. The mirror 1101 is in the approximate shape of a square, with the length of one side, for example, between 4 µm and 11 µm. The size of adjacent mirrors is also between, for example, 4 µm and 11 µm. The deflection axis 1111 of the mirror 1101 is on the diagonal line. The lower end of the elastic hinge 1102 is connected to the substrate member 1103 that includes a circuit for driving the mirror 1101. The upper end of the elastic hinge 1102 is connected to the bottom surface of the mirror 1101. An electrode for reliably maintain electrical connectivity and an intermediate member for strengthening the support structures and strengthening the connection may be placed between the elastic hinge 1102 and substrate 103, or between the elastic hinge 1102 and mirror 1101.

In FIGS. 3A through 3C, electrodes 1104 (i.e., 1104a and 1104b) used for driving the mirror 1101 are placed on the top surface of the substrate 1103, opposite the bottom surface of the mirror 1101. The form of the electrode 1104 may be symmetrical or asymmetrical about the deflection axis 1111. The electrode 1104 is made of aluminum or tungsten. The present embodiment is configured such that the electrode 1104 also carries out the function of a stopper for contacting and stopping the mirror from further movement when the mirror is deflected to a maximum deflection angle. The deflection angle of the mirror is the angle determined by the aperture ratio of a projection lens that satisfies a theoretical resolution determined by the size of adjacent mirrors on the basis of the equation below:

$$Rp=0.61*\lambda/NA=1.22*\lambda*F$$

Alternatively, larger deflection angle may be implemented. As an example, the deflection angle of the mirror 1101 may be controlled to operate between 10 degrees and 14 degrees relative to the horizontal state of the mirror 1101 or between 2 degrees and 10 degrees relative to the horizontal state of the mirror 1101. Configuring the electrode 1104 to also function as stopper makes it possible to maximize the electrode layout space when shrinking the mirror element, as compared to the conventional method of placing the electrode and stopper individually,.

The electrode may be formed, as shown in FIGS. 3A through 3C, as a trapezoid, with the top and bottom sides approximately parallel to the deflection axis 1111, and the sloped sides approximately parallel to the contour line of the mirror 1101 of the mirror device. The deflection axis of the mirror 1101 is matched with the diagonal line of the electrode. The electrode and stopper can usually be simultaneously manufactured as in the conventional method, and therefore such the electrode and stopper may be conveniently formed during the manufacturing processes.

A difference in potentials needs to be generated between the mirror and the electrode to drive the mirror by electrostatic force. The present embodiment using the electrode also as stopper is configured to provide the surface of the electrode and/or the rear surface of the mirror with an insulation layer(s) in order to prevent an electrical shorting at point of contact between the mirror and the electrode. If the surface of the electrode is coated with an insulation layer, the configuration may be such that the insulation layer covers only a part of the electrode, including the portion coming in contact with the mirror. FIGS. 3A through 3C exemplify the case of covering the surface of the electrode 1104 (i.e., 1104a and 1104b) with an insulation layer 1105 (i.e., 1105a and 1105b). The insulation layer is made of oxidized compounds, azotized compounds, silicon or silicon compounds, e.g., SiC, $SiO_2$, $Al_2O_3$, and Si. The material and thickness of the insulation layer is determined so that the dielectric strength voltage is maintained at no less than the voltage required to drive the mirror, preferably no less than 5 volts. For example, the dielectric strength voltage may be configured to be two times the drive voltage of the mirror or higher, 3 volts or higher or 10 volts or higher.

Figure 4:
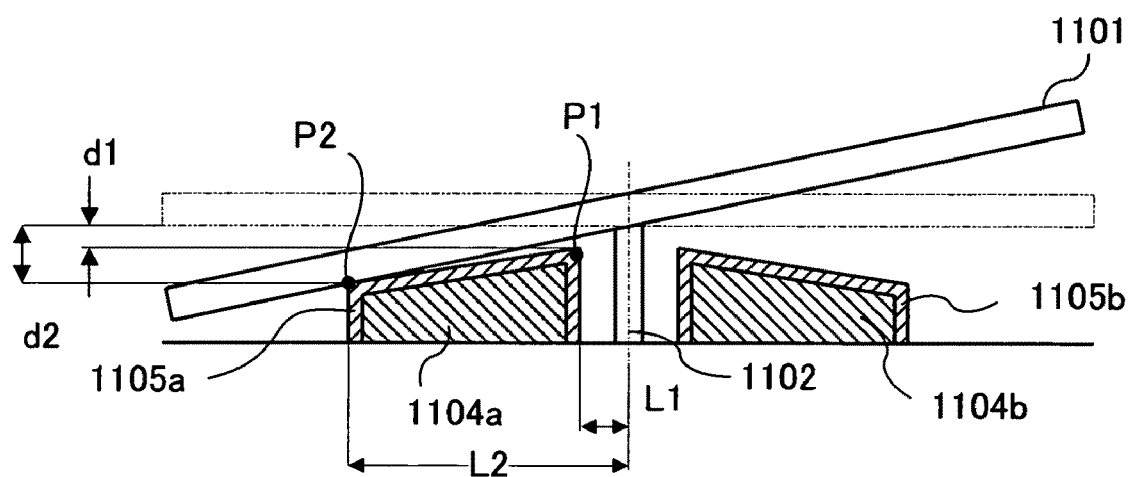
FIG. 4 shows a side cross sectional view for showing another configuration example of an electrode.

The following descriptions explain the size and shape of the electrode in one exemplary embodiment of this invention. Referring to FIG. 4 for side cross sectional view of a mirror, where "L1" is the distance between the deflection axis and the edge of the electrode on a side closer to the deflection axis of the mirror 1101. The distance shown by "L2" is the distance between the deflection axis and the edge of the electrode on a side farther from the deflection axis of the mirror 1101, and "d1" and "d2" are the distances between the mirror's bottom surface and the top of the electrode at its respective edges. "P1" is a representative point on the electrode's edge on the side closer to the deflection axis of the mirror, and "P2" is a representative point on the electrode's edge on the side farther from the deflection axis of the mirror.

The mirror shown in FIG. 4 is the case in which the electrode is formed so that d1<d2. In this configuration, the stopper determining the tilt angle of the mirror 1101 is preferably placed at the point P2 in consideration of a production variance of the electrode height that influences the deflection angle of the mirror. The present embodiment is accordingly configured to satisfy the relationship of:

$$d1 > (L1*d2)/L2$$

This configuration significantly improves the efficient usage of space under the mirror and maintains a stable deflection angle of the mirror. In the case of configuring the electrode to provide distances d1 and d2 with d1=d2, the point P2 on the corner of the electrode determining the deflection angle of the mirror, and the configuration is determined to satisfy the following equation:

$$\cot\theta = d2/L2$$

Figure 5A:
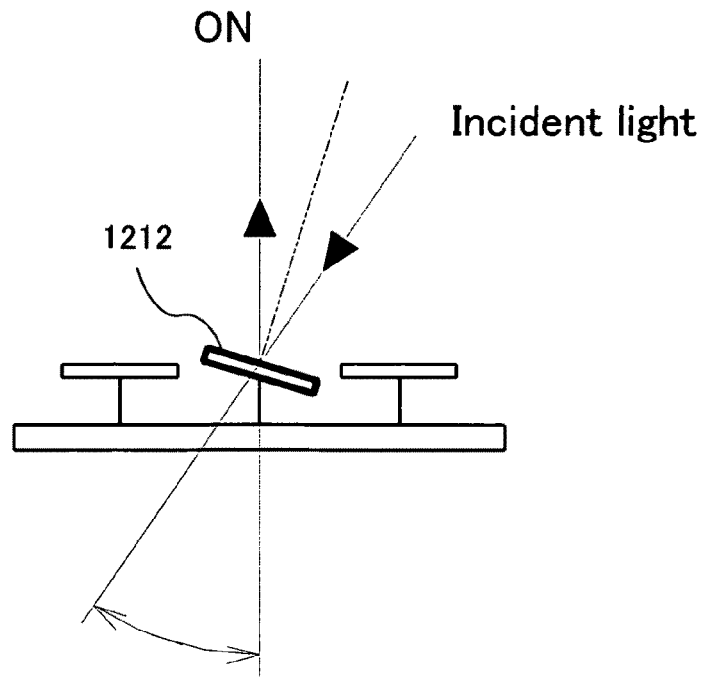
Figure 5C:
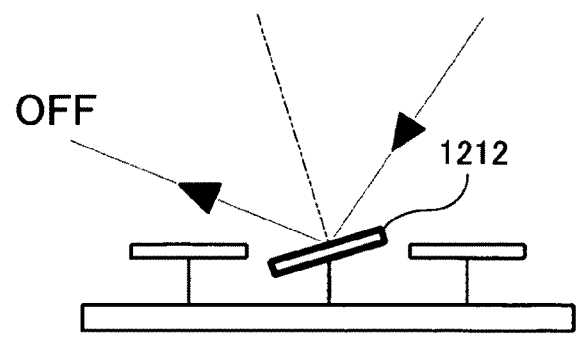
FIG. 5C is another side cross sectional view for showing an example of the deflection state when the mirror is OFF.
Figure 5B:
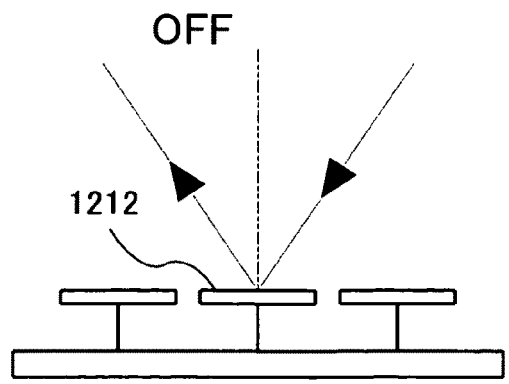
FIG. 5B is a side cross sectional view for showing an example of a deflection state when the mirror is OFF.

Referring to FIGS. 5A to 5C for showing the light reflection from the mirrors. The mirror configuration and operation of mirror deflections present different deflection states when different voltages are applied to the electrodes. The light incident to the mirror 1212 is deflected in a specific direction as shown in FIGS. 5A through 5C.

The following description outlines the natural oscillation frequency of the oscillation system of a mirror device according to the present embodiment.

As discussed above, a reduced drive voltage when applied to a mirror with intermediate oscillation states can achieve a gray scale with higher resolution. With a least significant bit (LSB) defining a minimum controllable light intensity in a pulse width modulator (PWM) through mirror oscillation, the natural oscillation cycle of an oscillating mirror supported on an elastic hinge is further described below.

The natural oscillation cycle T of an oscillation system can be determined as: $T = 2*\pi*\sqrt{(I/K)} = \text{LSB time}/X[\%]$;

where:
- I: the rotation moment of an oscillation system,
- K: the spring constant of an elastic hinge, LSB time: the LSB cycle at displaying n bits, and
- X [%]: the ratio of the light intensity obtained by one oscillation cycle to the Full-ON light intensity of the same cycle Note that:
- "I" is determined by the weight of the mirror and the distance between the center of gravity and the center of rotation;
- "K" is determined from the thickness, width, length and cross-sectional shape of an elastic hinge;
- "LSB time" is determined from one frame time, or one frame time and the number of reproduction bits in the case of a single-panel projection method;
- "X" is determined according to the above description, particularly from the F-number of a projection lens and the intensity distribution of an illumination light.

As an example, when a single-panel color sequential method is employed, the ratio of emission intensity by one oscillation is assumed to be 32%, and the minimum emission intensity in a 10-bit grayscale is achievable by an oscillation, then "I" and "K" are designed so as to have a natural oscillation cycle as follows:

$$T = 1/(60*3*2^{10}*0.32) \approx 17.0\ \mu sec.$$

In contrast, when a conventional PWM control is employed, the changeover transition time $t_M$ of a mirror is approximately equal to the natural oscillation frequency of the oscillation system of the mirror. Accordingly, the LSB is required to control the mirror that the light intensity in the interim during the changeover transition can be ignored. The gray scale reproducible with the above-described hinge is about 8-bit, even if the LSB is set at five times the changeover transition time $t_M$. Therefore, compared with a conventional display system, the display systems of this invention can achieve an image display with a 10-bit grayscale by using the 8-bit grayscale control signals because of the implementation of the intermediate control states.

In another exemplary embodiment for an image display system to display image with a 13-bit gray scale by a single-panel projection apparatus, the length of time represented by a LSB can be calculated as follows:

$$\text{LSB time} = (1/60)*(1/3)*(1/2^{13}) = 0.68\ \mu sec$$

For a display system with intermediate control state controllable to project 38% of the ON state intensity, the oscillation cycle T is as follows:

$$T = 0.68/38\% = 1.8\ \mu sec$$

In contrast, when attempting to obtain an 8-bit grayscale in a multi-panel projection apparatus described above, the length of time represented by the LSB can be calculated as follows:

$$\text{LSB time} = (1/60)*(1/3)*(1/2^{8}) = 21.7\ \mu sec$$

In another exemplary embodiment, when the light intensity obtained in one cycle by controlling the mirror to operate in an intermediate state is 20% of the ON state intensity, then the oscillation cycle T can be set as follows:

$$T = 21.7/20\% = 108.5\ \mu sec.$$

As described above, the present embodiment is configured to set the mirror to oscillate with a natural oscillation cycle of the oscillation system. The display system includes an elastic hinge. The natural oscillation cycle can be set between about 1.8 μsec and 108.5 μsec with three deflection states. The mirror element in a first deflection state is modulated by the mirror element directed towards the projection light path. The mirror element in the second deflection state is controlled to reflect a light in a direction away from the projection light path. The mirror element in a third deflection state is controlled to oscillate between the first and second deflection states. The intermediate state provide a reduced amount of controllable light thus enabling the display system to display images of a gray scale with higher resolution without increasing the drive voltage of the mirror element.

As described above, the present embodiment is configured to make the electrode also function as a stopper for regulating the maximum deflection angle of the mirror. By configuring the electrode to sever also as a stopper increases the efficiency of space usage while shrinking the mirror element and expanding the area of the electrode.

Disclosure Content 2

The following detail description is provided for an exemplary embodiment of the present invention by referring to the accompanying drawings.

Figure 6:
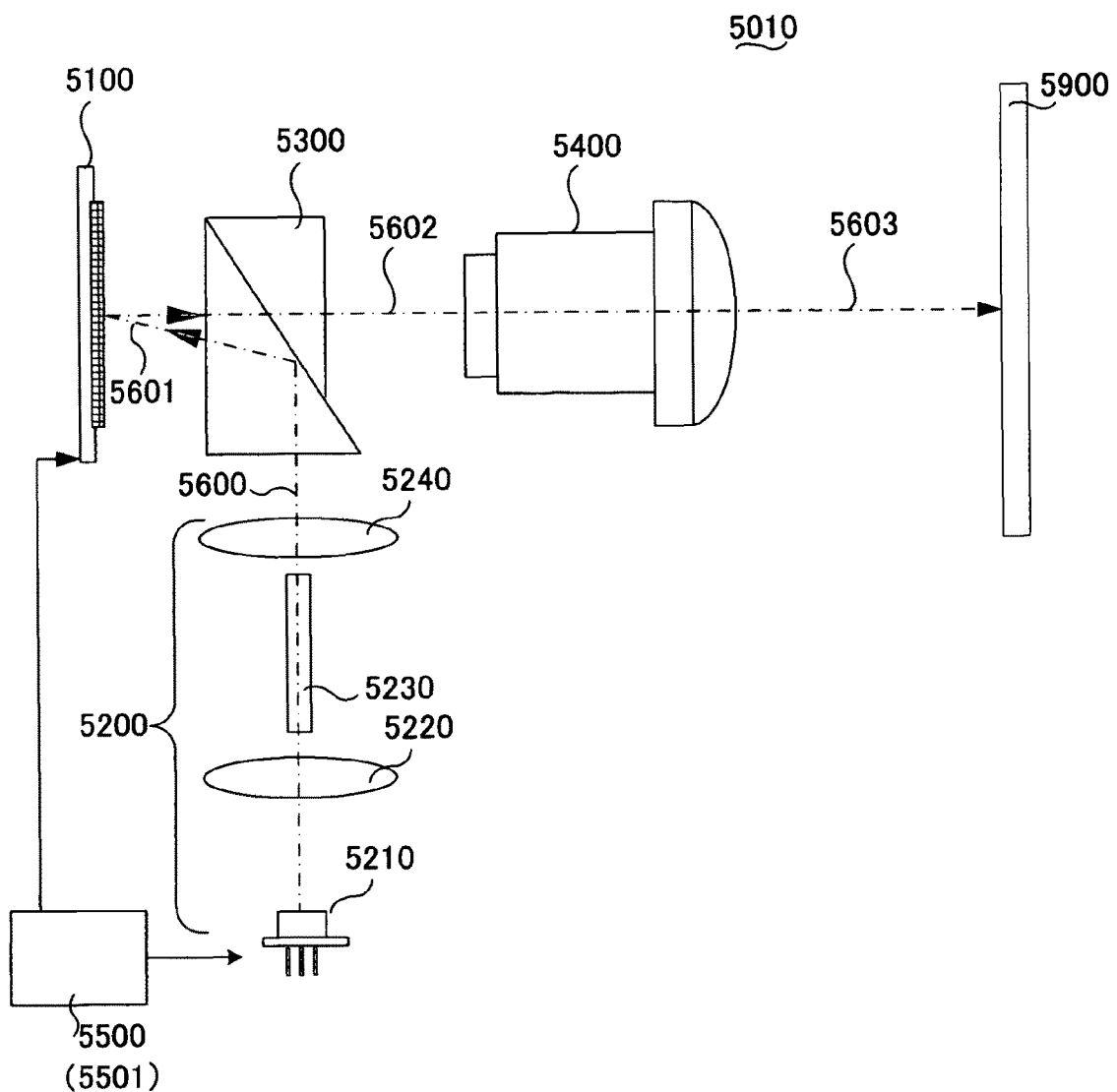
FIG. 6 is a block diagram for showing the configuration of a projection apparatus according to a preferred embodiment of the present invention.

FIG. 6 is a functional block diagram for showing the configuration of a projection apparatus according to a preferred embodiment of the present invention.

FIG. 6 shows a projection apparatus 5010 according to the present embodiment comprises a single spatial light modulator (SLM) 5100, a control unit 5500, a Total Internal Reflection (TIR) prism 5300, a projection optical system 5400 and a light source optical system 5200.

The projection apparatus 5010 is commonly referred to as a single-panel projection apparatus 5010 that includes a single spatial light modulator 5100.

The projection optical system 5400 includes a spatial light modulator 5100 and a TIR prism 5300 disposed along the optical axis of the projection optical system 5400, and the light source optical system 5200 is disposed for projecting a light along the optical axis matches with the optical path of the projection optical system 5400.

The TIR prism 5300 receives the incoming illumination light 5600 projects from the light source optical system 5200 and directs the light to transmit as incident light 5601 to the spatial light modulator 5100 at a prescribed inclination angle. The SLM 5100 further reflects and transmits a the reflection light 5602, towards the projection optical system 5400.

The projection optical system 5400 receives the light 5602 reflected from the SLM 5100 onto a screen 5900 as projection light 5603.

The light source optical system 5200 comprises a variable light source 5210 for generating the illumination light 5600, a condenser lens 5220 for focusing the illumination light 5600, a rod type condenser body 5230 and a condenser lens 5240.

The variable light source 5210, condenser lens 5220, rod type condenser body 5230 and condenser lens 5240 are sequentially placed in the aforementioned order along the optical axis of the illumination light 5600 emitted from the variable light source 5210 and incident to the side face of the TIR prism 5300.

The projection apparatus 5010 employs a single spatial light modulator 5100 for projecting a color display on the screen 5900 by applying a sequential color display method. Specifically, the variable light source 5210 comprises a red laser light source 5211, a green laser light source 5212 and a blue laser light source 5213 (not specifically shown here). The variable light source allows independent controls for the light emission states. The controller of the variable light source performs an operation of dividing one frame of display data into a plurality of sub-fields (i.e., three sub-fields, that is, red (R), green (G) and blue (B) in the present case) and turns on each of the red laser light source 5211, green laser light source 5212 and blue laser light source 5213 to emit each respective light in time series at the time band corresponding to the sub-field of each color as will be described later. In an exemplary embodiment, the light sources are laser light sources. In alternate embodiment, the light sources may also be semiconductor light sources such as the light emitting diodes (LEDs).

Figure 7:
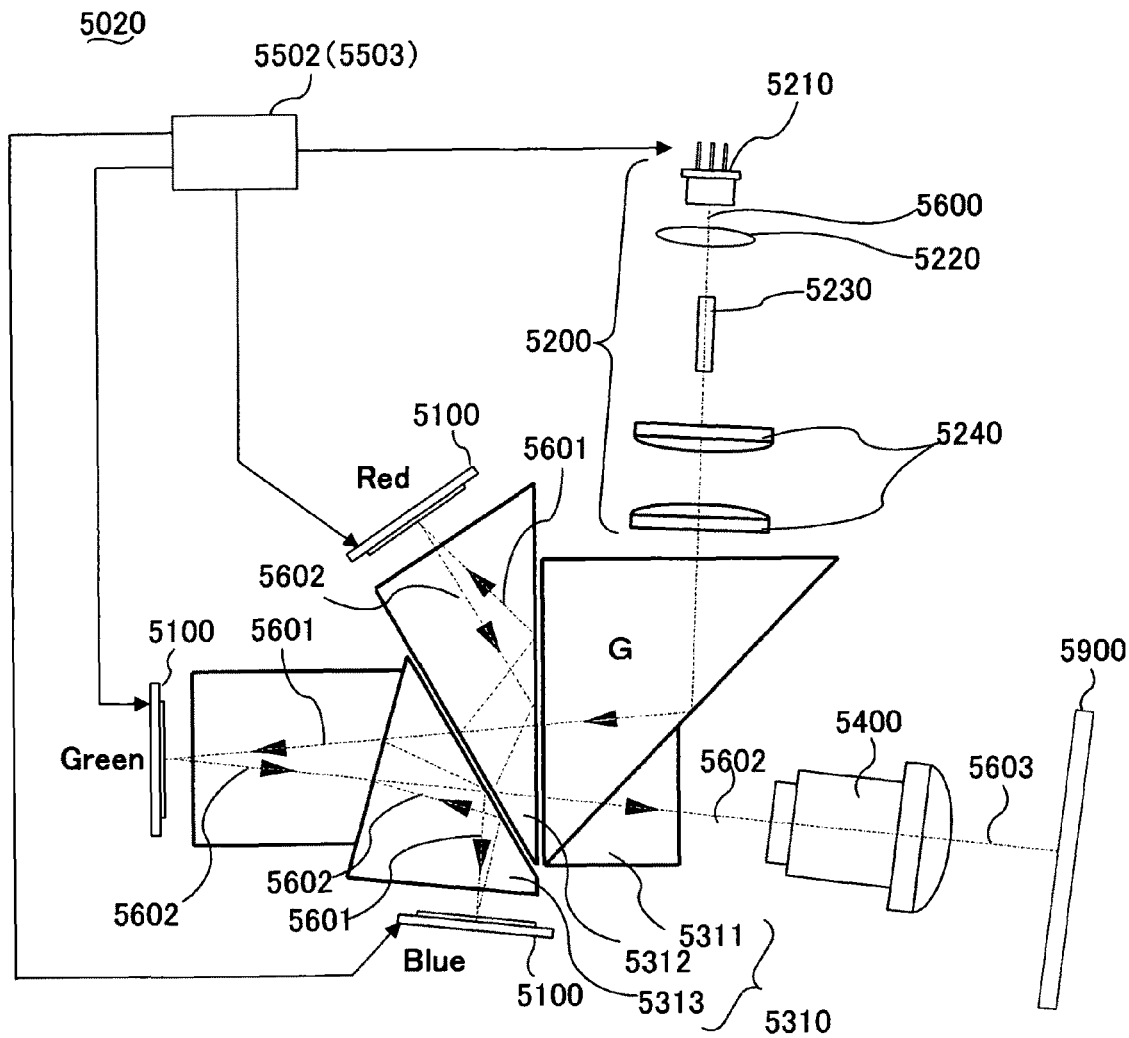
FIG. 7 is a block diagram for showing the configuration of a single-panel projection apparatus according to another preferred embodiment of the present invention.

FIG. 7 is a functional block diagram for showing the configuration of a projection apparatus according to an alternate preferred embodiment of the present invention.

The projection apparatus 5020 is commonly referred to as a multiple-plate projection apparatus that includes a plurality of spatial light modulators 5100 instead of a single SLM included in the single-panel projection apparatus 5010 described earlier. Further, the projection apparatus 5020 comprises a control unit 5502 in place of the control unit 5500.

The projection apparatus 5020 comprises a plurality of spatial light modulators 5100, and further includes a light separation/synthesis optical system 5310 between the projection optical system 5400 and each of the spatial light modulators 5100.

The light separation/synthesis optical system 5310 comprises a plurality of TIR prisms, i.e., a TIR prism 5311, a prism 5312, and a prism 5313.

The TIR prism 5311 carries out the function of directing the illumination light 5600 projected along the optical axis of the projection optical system 5400 and directs the light to the spatial light modulator 5100 as incident light 5601.

The TIR prism 5312 carries out the function of separating red (R) light from an incident light 5601, projected by way of the TIR prism 5311, to transmit the red light to the spatial light modulators for the red light 5100, and further carries out the function of directing the reflection light 5602 of the red light to the TIR prism 5311.

Likewise, the prism 5313 carries out the functions of separating blue (B) and green (G) lights from the incident light 5601 projected by way of the TIR prism 5311, and directs the light to the blue color-use spatial light modulators 5100 and green color-use spatial light modulators 5100, and further carries out the function of directing the reflection light 5602 of the green light and blue light to the TIR prism 5311.

Therefore, the spatial light modulations of these three colors, R, G and B, carry out these functions simultaneously by these three spatial light modulators 5100. The reflection light 5602, resulting from the respective modulations, is projected onto the screen 5900 as the projection light 5603 by way of the projection optical system 5400, and thus a color display is carried out.

Note that the system may implement various modifications by using a light separation/synthesis optical system instead of the light separation/synthesis optical system 5310 described above.

Figure 8A:
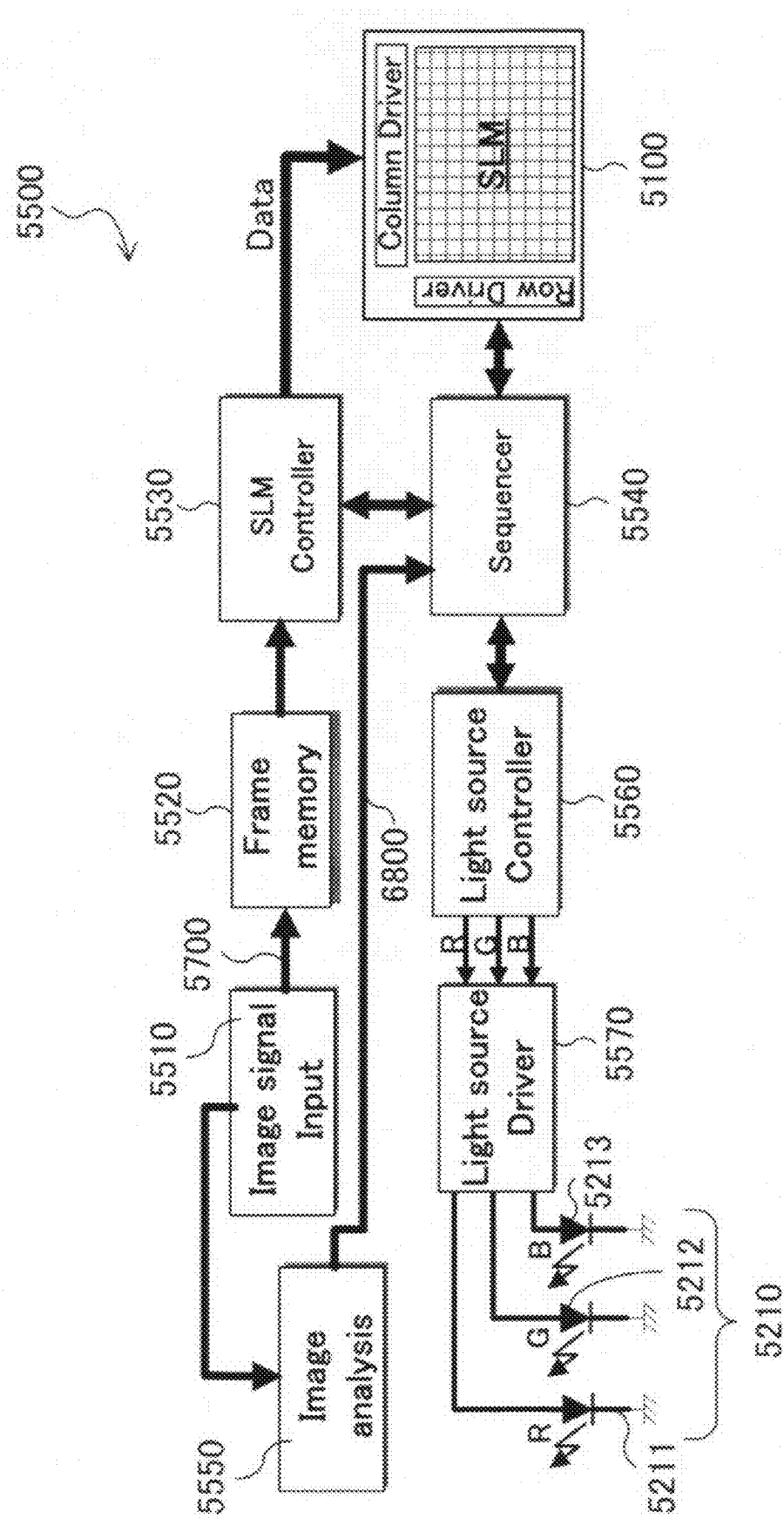
FIG. 8A is a block diagram for showing the configuration of a control unit provided to a single-panel projection apparatus according to a preferred embodiment of the present invention.

FIG. 8A is a functional block diagram for showing a configuration of the control unit 5500 implemented in the above described single-panel projection apparatus 5010. The control unit 5500 comprises a frame memory 5520, an SLM controller 5530, a sequencer 5540, a light source control unit 5560 and a light source drive circuit 5570.

The sequencer 5540 includes a microprocessor to control the operation timing of the entire control unit 5500 and the spatial light modulators 5100.

In one exemplary embodiment, the frame memory 5520 retains one frame of input digital video data 5700 received from an external device (not shown in the figure) connected to a video signal input unit 5510. The input digital video data 5700 is updated in real time whenever the display of one frame is completed.

The SLM controller 5530 processes the input digital video data 5700 read from the frame memory 5520 as described later. The SLM controller separates the data read from the memory 5520 into a plurality of sub-fields according to detail descriptions further describe below. The SLM controller outputs the data subdivided into subfields to the spatial light modulators 5100 as binary data 5704 and non-binary data 5705, which are used for implementing an the ON/OFF control and oscillation control (which are described later) of a mirror 5112 of the spatial light modulator 5100.

The sequencer 5540 outputs a timing signal to the spatial light modulators 5100 in sync with the generation of the binary data 5704 and non-binary data 5705 at the SLM controller 5530.

The video image analysis unit 5550 outputs a image analysis signal 5800 used for generating various light source pulse patterns (which are described later) corresponding to the input digital video data 5700 inputted from the video signal input unit 5510.

The light source control unit 5560 controls the light source drive circuit 5570 to control the operation of the variable light source 5210 by using a light source profile control signal in emitting the illumination light 5600 The light source profile control signal is generated from the image analysis signal 5800 on the basis of the input of the image analysis signal 5800 generated by the video image analysis unit 5550 using data of the light source pulse patterns generated by the sequencer 5540 as will be further described below.

The light source drive circuit 5570 performs the operation of driving the red laser light source 5211, green laser light source 5212 and blue laser light source 5213 of the variable light source 5210 to emit light, respectively. The light source generates the light source pulse patterns 5801 through 5811 (which are described later) received from the light source control unit 5560.

Figure 8B:
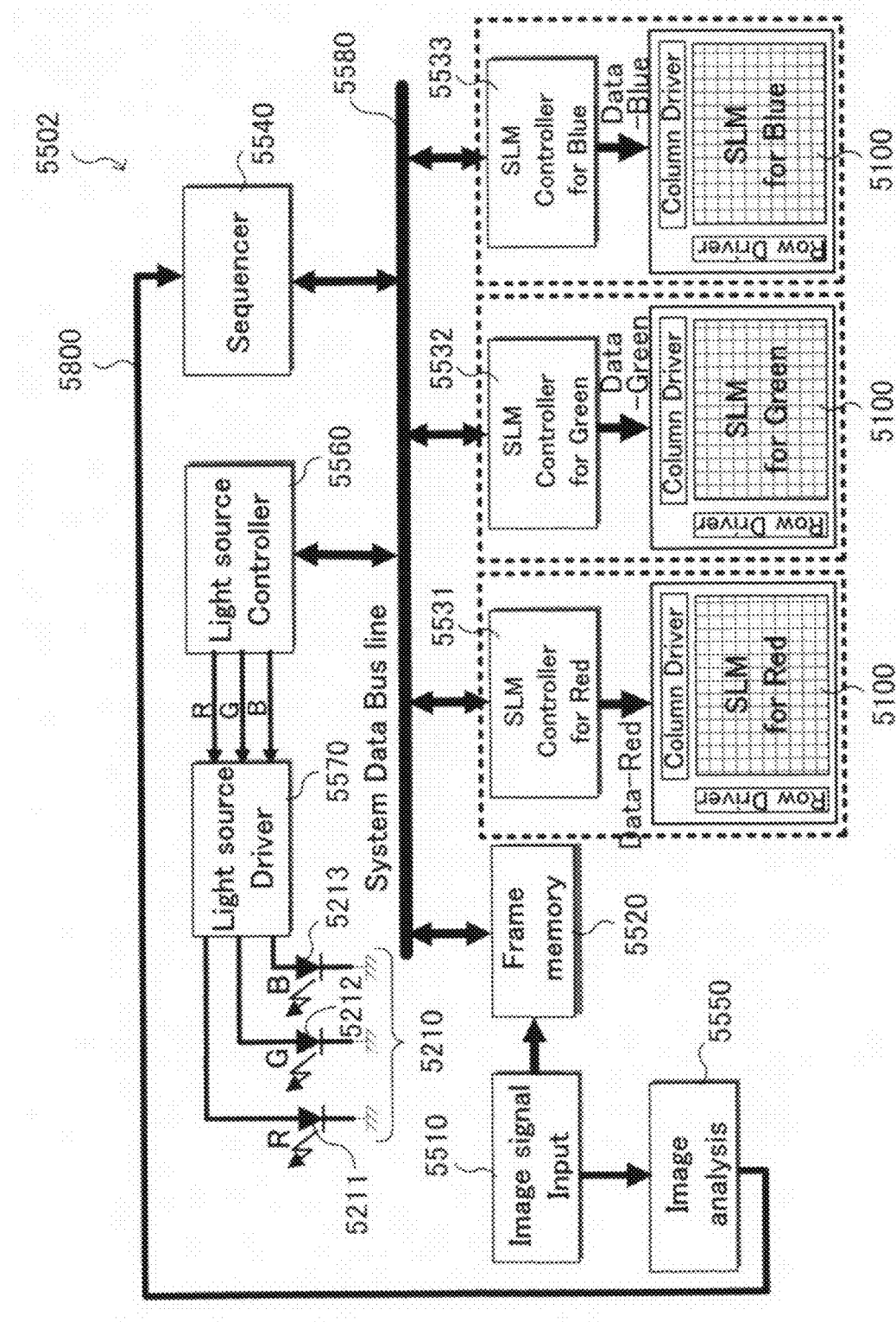
FIG. 8B is a block diagram for showing the configuration of a the control unit of a multi-panel projection apparatus according to a preferred embodiment of the present invention.

FIG. 8B is a functional block diagram for illustrating the configuration of the control unit of a multi-panel projection apparatus according to the present embodiment.

The control unit 5502 comprises a plurality of SLM controllers 5531, 5532 and 5533, which are used for controlling each of the spatial light modulators 5100. Each of these modulators is implemented for modulating the respective colors R, G and B, and the configuration of the controllers is the main difference between the control unit 5502 and the control unit 5500 described in FIG. 8A.

Specifically, each of the SLM controller 5531, SLM controller 5532 and SLM controller 5533, is implemented to process the modulation of a respective colors Red, Green, and Blue. Each modulator is supported on the same substrates as those of the respective spatial light modulators 5100. This configuration makes it possible to place the individual spatial light modulators 5100 and the corresponding SLM controller 5531, SLM controller 5532 and SLM controller 5533 close to each other, thereby enabling a high speed data transfer rate.

Further, a system bus 5580 is used to connect the frame memory 5520, light source control unit 5560, sequencer 5540 and SLM controllers 5531 through 5533, in order to speed up and simplify the connection path of each connecting element.

Figure 9A:
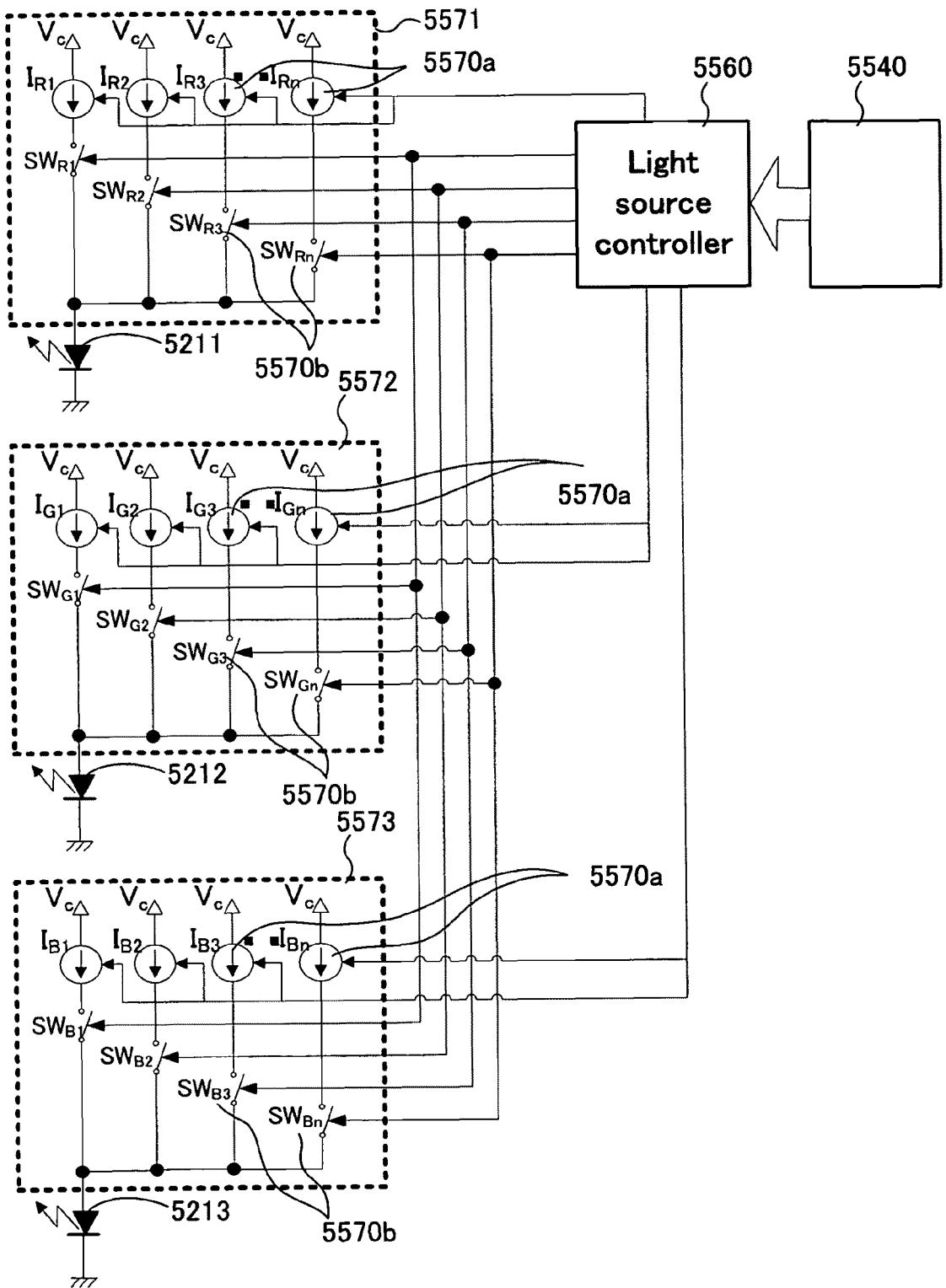
FIG. 9A is a block diagram for showing a configuration of a light source drive circuit of a projection apparatus according to a preferred embodiment of the present invention.

FIG. 9A is a block diagram for showing the configuration of the light source drive circuit 5570 (i.e., the light source drive circuits 5571, 5572 and 5573) according to the present embodiment.

The light source drive circuit shown in FIG. 9A includes a plurality of constant current circuits 5570a (i.e., I (R, G, B)$_1$ through I (R, G, B)$_n$) and a plurality of switching circuits 5570b (i.e., switching circuits SW (R, G, B)$_1$ through SW (R, G, B)$_n$) corresponding to the respective constant current circuits 5570a, in order to generates the desired light intensities. The light emission are shown as P$_1$ through P$_n$ for the light source optical system 5200 (i.e., the red laser light source 5211, green laser light source 5212 and blue laser light source 5213).

The switching circuit 5570b carries out a switching in accordance with a desired emission profile of the light source optical system 5200 (i.e., the red laser light source 5211, green laser light source 5212 and blue laser light source 5213).

The setup values of the output current of the constant current circuits 5570a (i.e., constant current circuits I (R, G, B)$_n$), when the gray scale of the emission intensity of the light source optical system 5200 is designated at N bits (where N≧n), are as follows:

$$I(R, G, B)_1 = I_{th} + LSB$$

$$I(R, G, B)_2 = LSB + 1$$

$$I(R, G, B)_3 = LSB + 2$$

...

...

$$I(R, G, B)_n = MSB$$

In this exemplary embodiment, a gray scale display controlled on the basis of the emission intensity. A similar gray scale display is achievable even if the emission period (i.e., an emission pulse width) and the emission interval (i.e., an emission cycle) are variable.

The relationship between the emission intensity Pn of the variable light source and drive current for each color in this case is as follows. Note that "k" is an emission efficiency corresponding to the drive current:

$$P_1 = k*(I_{th} + I_1)$$

$$P_2 = k*(I_{th} + I_1 + I_2)$$

...

...

$$P_n = k*(I_{th} + I_1 + I_2 + ... + I_{n-1} + I_n)$$

Figure 9B:
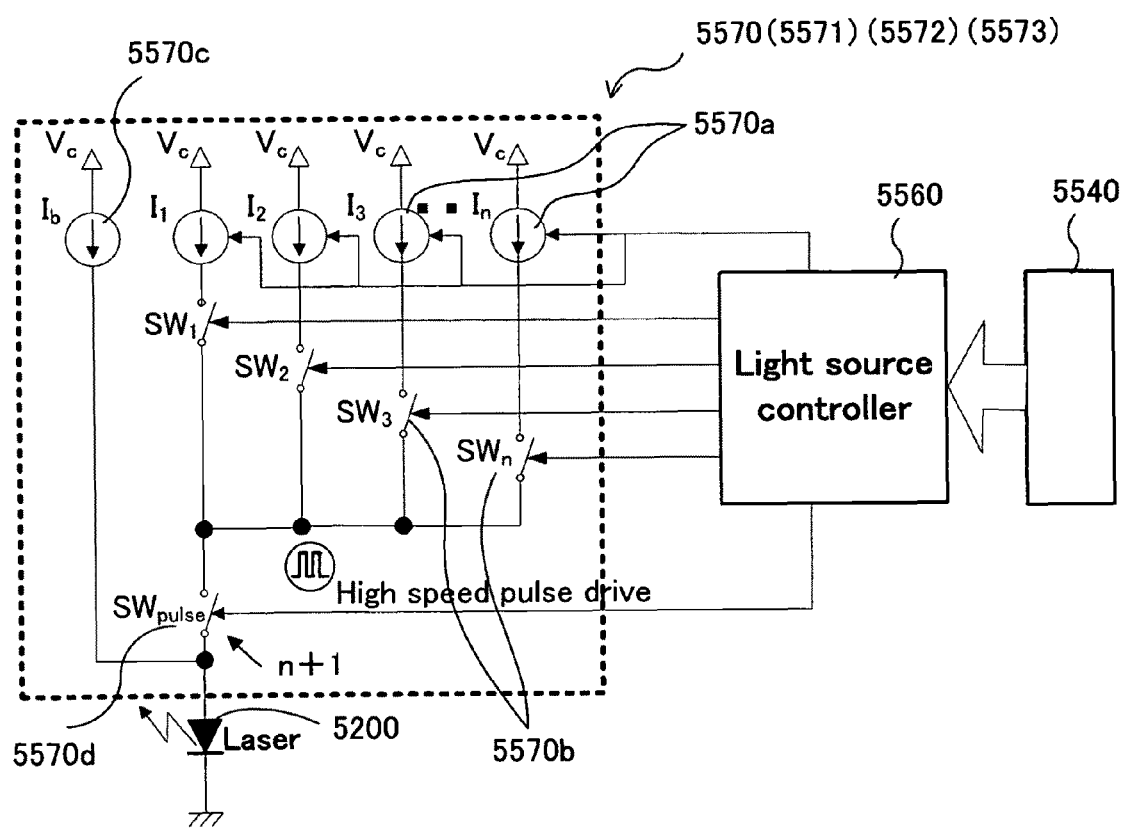
FIG. 9B is a block diagram for showing an alternate configuration of a light source drive circuit of a projection apparatus according to a preferred embodiment of the present invention.

FIG. 9B is a block diagram for showing a modified embodiment of the configuration of the light source drive circuit according to the present embodiment.

For simplicity, FIG. 9B denotes the constant current circuits 5570a (I (R, G, B)$_1$ through I (R, G, B)$_n$) as I$_I$ through I$_n$ and the switching circuits 5570b (SW (R, G B)$_1$ through SW (R, G, B)$_n$) as switching circuits 5570b (SW$_1$ through SW$_n$).

As described later, the light source drive circuits 5570 according to the present embodiment is configured to control the individual constant current circuit 5570a (i.e., I (R, G, B)$_1$ in this case) to supply a current equivalent to the threshold current I$_{th}$ of the light source optical system 5200. Alternately, the individual constant current circuit supplies a current close to the aforementioned threshold current, as a bias current I$_b$ when a semiconductor laser or a similar light source is used as the light source optical system 5200. By using a high-speed current drive, the respective switching operation of the light source drive circuits 5570 is stabilized to provide a high-speed emission.

The light source drive circuits 5570 (i.e., the light source drive circuits 5571, 5572, and 5573) shown in FIG. 9B comprises bias current circuits 5570c, which are continuously connected to the light source optical systems 5200 (i.e., the red laser light source 5211, green laser light source 5212 and blue laser light source 5213) and which are used for applying a bias current I$_b$, in addition to the constant current circuits 5570a.

Further, the connection of the constant current circuits 5570a to the light source optical systems 5200 is configured through a switching circuit 5570d (SW$_{pulse}$) that includes on the downstream side of the switching circuits 5570b.

As shown in FIG. 9B, the relationship between the emission intensity P$_n$ and drive current of the variable light source for each wavelength is as follows, where "k" is the emission efficiency in terms of drive current:

$$P_b = k*I_b(I_b \approx I_{th})$$

$$P_1 = k*(I_{th} + I_1)$$

$$P_2 = k*(I_{th} + I_1 + I_2)$$

...

...

$$P_n = k*(I_{th} + I_1 + I_2 + ... + I_{n-1} + I_n)$$

That is, the relationship between each switching operation and emission output is as follows:

$$SW_{pulse} = \text{OFF: } P_b = k * I_b \approx 0 \text{ [mW] (where } I_b \approx I_{th})$$

$$SW_1 : P_1 = k * (I_b + I_1)$$

$$SW_2 : P_2 = k * (I_b + I_1 + I_2)$$

...

...

$$SW_n : P_n = k * (I_b + I_1 + I_2 + ... + I_{n-1} + I_n)$$

FIG. 9B shows an embodiment wherein the switching circuits 5570d can carries out a circuit operation unaffected by a drive current switching over that may be caused by the switching circuits 5570b ($SW_1$ through $SW_n$). Each of the switching circuits 5570b is connected to the respective constant current circuits 5570a. Particularly, a further function is carried out that when the variable light source 5210 is not emitting light, the above-described switching circuits ($SW_1$ through $SW_n$) are switched over.

While the bias current value is designated at a fixed current value in the configuration of FIG. 9B, it is also possible to connect the bias current circuit 5570c to the light source control unit 5560 and allows a variable bias current.

Figure 10:
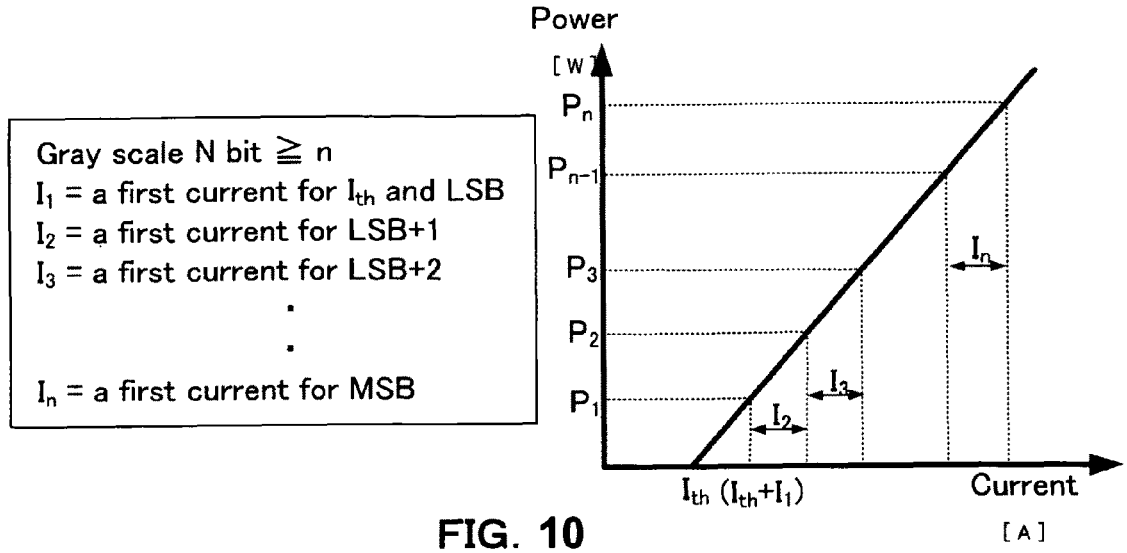
FIG. 10 is a diagram for showing the relationship between the applied current and the intensity of emission of the light source drive circuit according to a preferred embodiment of the present invention.

FIG. 10 is a diagram for showing the relationship between the applied current I and emission intensity $P_n$ of the constant current circuit 5570a of the light source drive circuit shown in the above described FIG. 9A.

Figure 11:
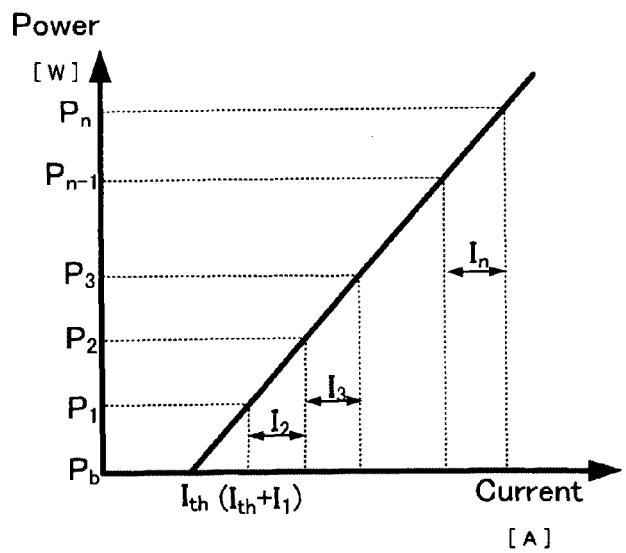
FIG. 11 is a diagram for showing the relationship between the applied current and the intensity of emission of the constant current circuit according to a preferred embodiment of the present invention.

FIG. 11 is a diagram for showing the relationship between the applied current I and emission intensity $P_n$ of the constant current circuit 5570a of the light source drive circuit shown in the above described FIG. 9B.

Note that the descriptions for FIGS. 9A and 9B have been provided for the case of changing the emission profiles of the variable light source for each sub-frame corresponding to each gray scale bit. If the display gray scale function of the spatial light modulator 5100 is used in parallel, the number of required levels of electrical current decreases, thus reducing the number of constant current circuits 5570a and also the number of the switching circuits 5570b. It is therefore possible to obtain the number of gray scales equal to, or higher than, the gray scales achievable through the modulation process of the spatial light modulator 5100.

The following detail description is for an exemplary configuration of the spatial light modulator 5100 according to the present embodiment.

The spatial light modulator 5100 according to the present embodiment is a deflectable mirror device that arranges a plurality of mirror elements in two-dimensional array.

Figure 12:
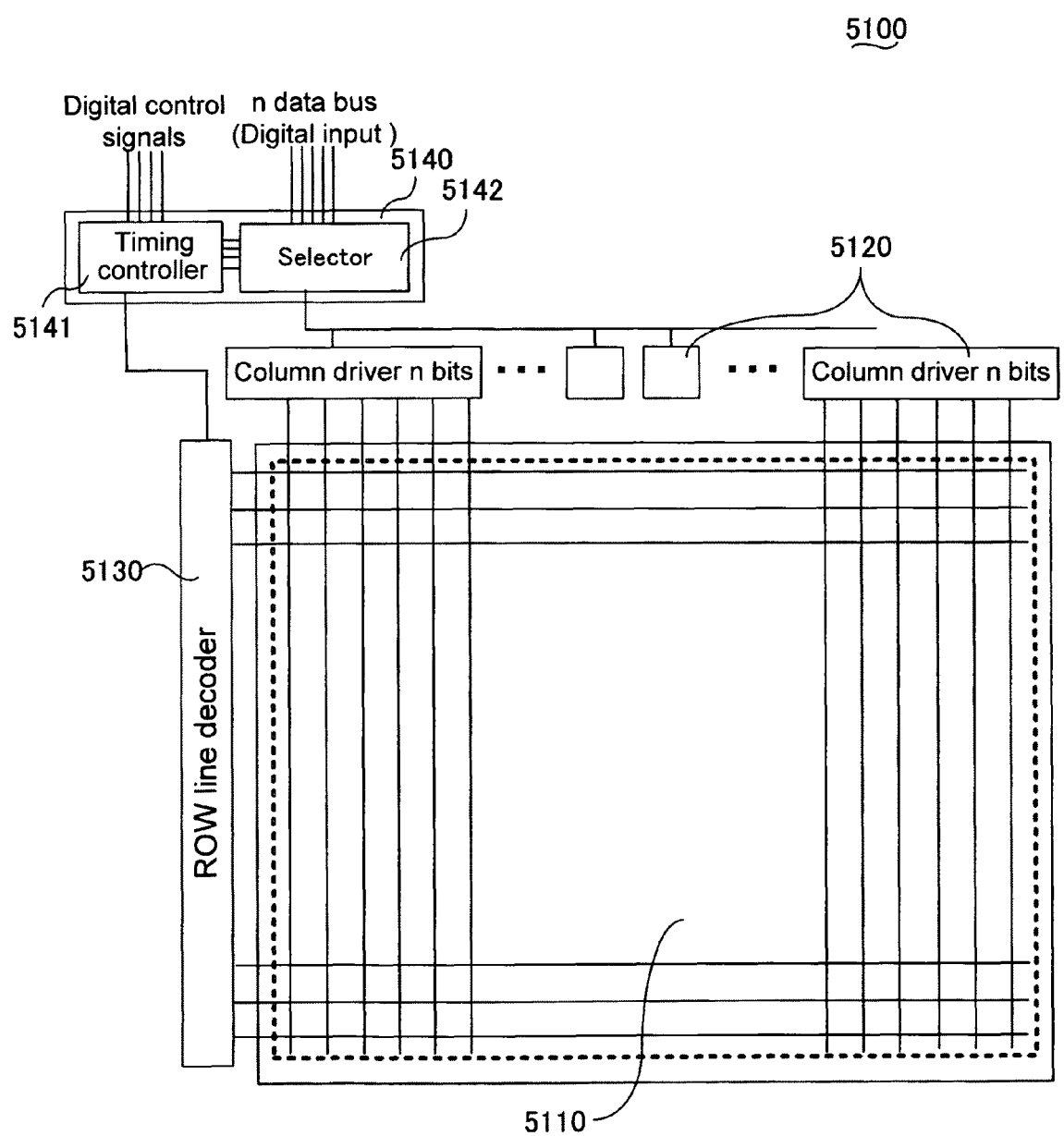
FIG. 12 is a schematic diagram for showing the layout of the internal configuration of a spatial light modulator according to a preferred embodiment of the present invention.

FIG. 12 is a circuit schematic diagram for illustrating the layout of the internal configuration of the spatial light modulator 5100 according to the present embodiment.

Figure 13:
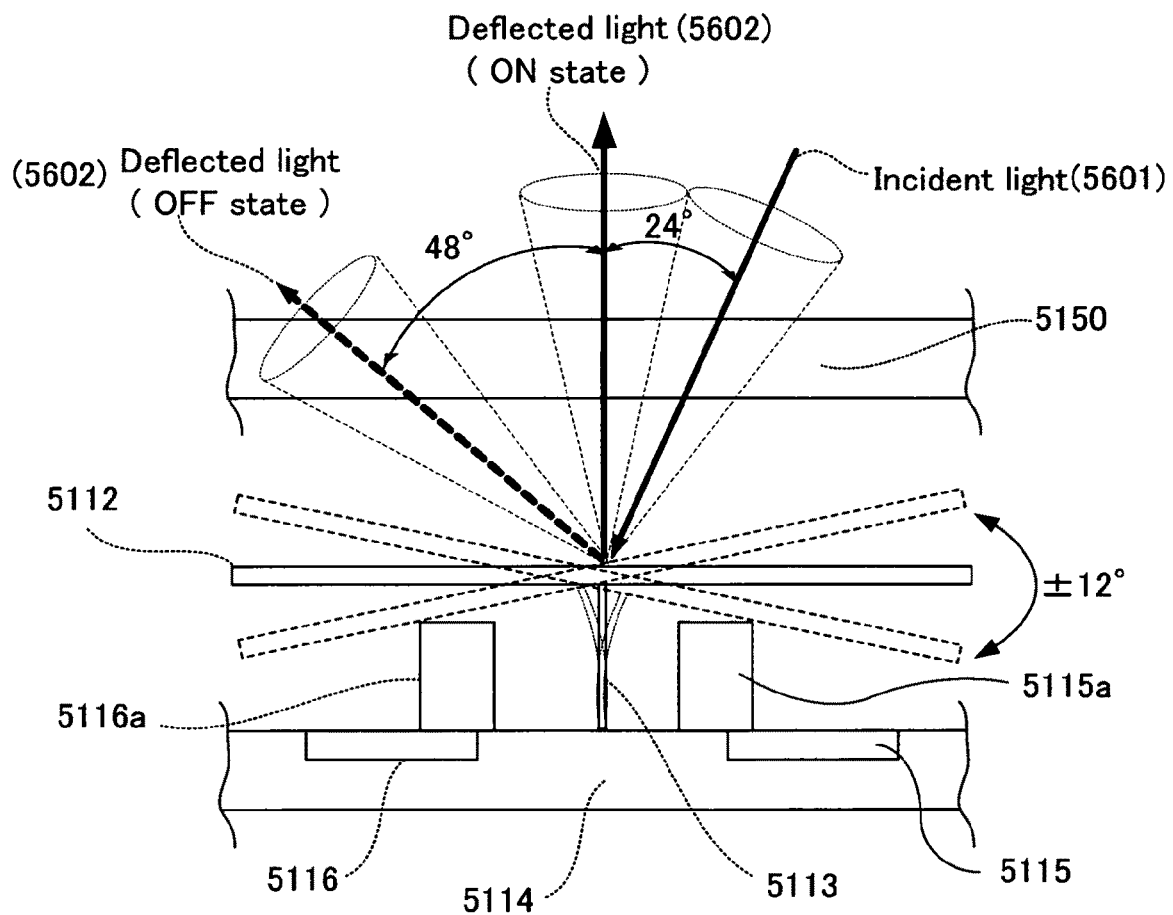
FIG. 13 is a cross-sectional view of an individual pixel unit implemented in a spatial light modulator according to a preferred embodiment of the present invention.
Figure 14:
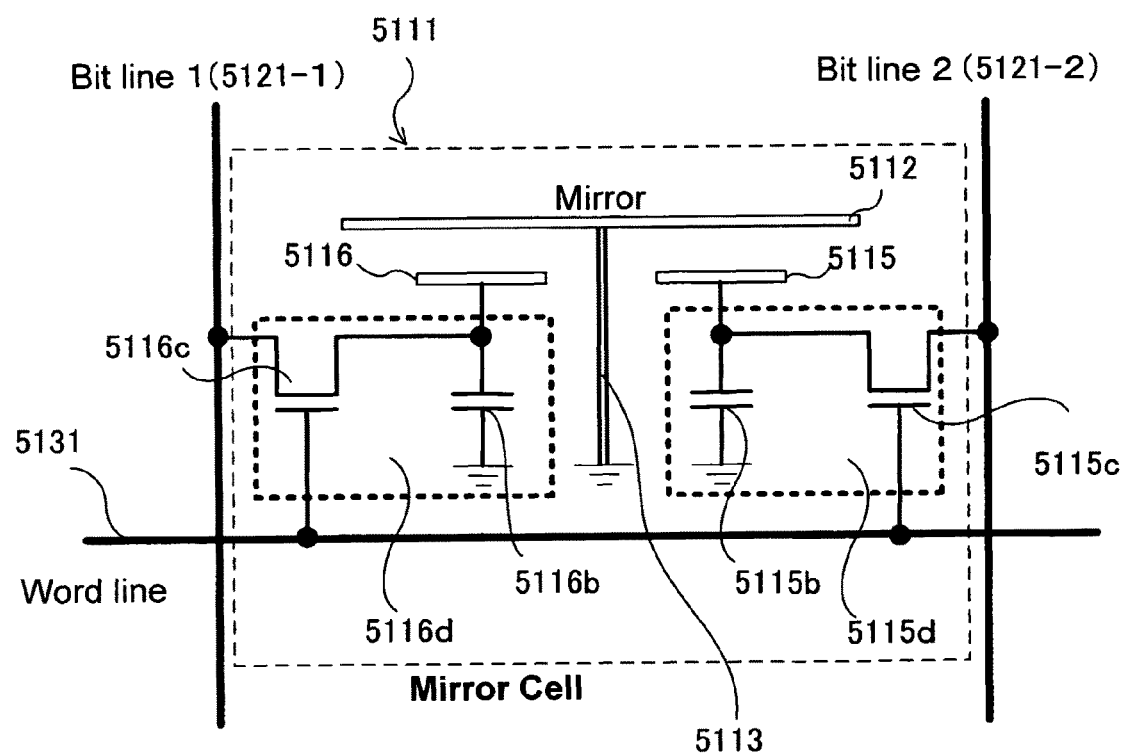
FIG. 14 is a block diagram for showing the configuration of an individual pixel unit implemented in a spatial light modulator according to a preferred embodiment of the present invention.

FIG. 13 is a cross-sectional diagram of an individual pixel unit constituting the spatial light modulator 5100 according to the present embodiment. FIG. 14 is a side cross sectional view for showing the configuration of an individual pixel unit implemented in the spatial light modulator 5100 according to the present embodiment.

FIG. 12 shows an exemplary embodiment of a spatial light modulator 5100 that includes a mirror element array 5110, column drivers 5120, ROW line decoders 5130 and an external interface unit 5140.

The external interface unit 5140 comprises a timing controller 5141 and a selector 5142. The timing controller 5141 controls the ROW line decoder 5130 on the basis of a timing signal from the SLM controller 5530. The selector 5142 supplies the column driver 5120 with digital signal incoming from the SLM controller 5530.

In the mirror element array 5110, a plurality of mirror elements are arrayed at the positions where individual bit lines 5121 vertically extended from the column drivers 5120, crosses over the individual word lines 5131 horizontally extended from the ROW line decoders 5130.

As exemplified in FIG. 13 the individual mirror element 5111 that includes a freely deflectable mirror 5112 supported on a substrate 5114 by way of a hinge 5113. The mirror 5112 is covered with a cover glass 5150 for protection.

The mirror further includes an OFF electrode 5116 (and an OFF stopper 5116a) and an ON electrode 5115 (and an ON stopper 5115a). The electrodes and stoppers are symmetrically placed across the hinge 5113 on the substrate 5114.

The OFF electrode 5116 attracts the mirror 5112 with a coulomb force by the application of a predetermined voltage and tilts the mirror 5112 to a position of contact with the OFF stopper 5116a. This causes the incident light 5601 incident to the mirror 5112 to reflect in a light path along an OFF direction away from the optical axis of the projection optical system 5400.

The ON electrode 5115 draws the mirror 5112 with a coulomb force by applying a predetermined voltage and tilts the mirror 5112 to a position of contact with the ON stopper 5115a. This causes the incident light 5601 incident to the mirror 5112 reflect in a light path along the ON direction to align with the optical axis of the projection optical system 5400.

Disclosure Content 3

The following detail description is for an alternate preferred embodiment of the present invention by referring to the accompanying drawings.

The following description provides various embodiments by taking into account the configurations and operations of the projection apparatuses exemplified as described above in FIGS. 6 through 14. Note that the same reference symbols are assigned to the same constituent components included in the above-described embodiment and further description is not repeated here.

Figure 15:
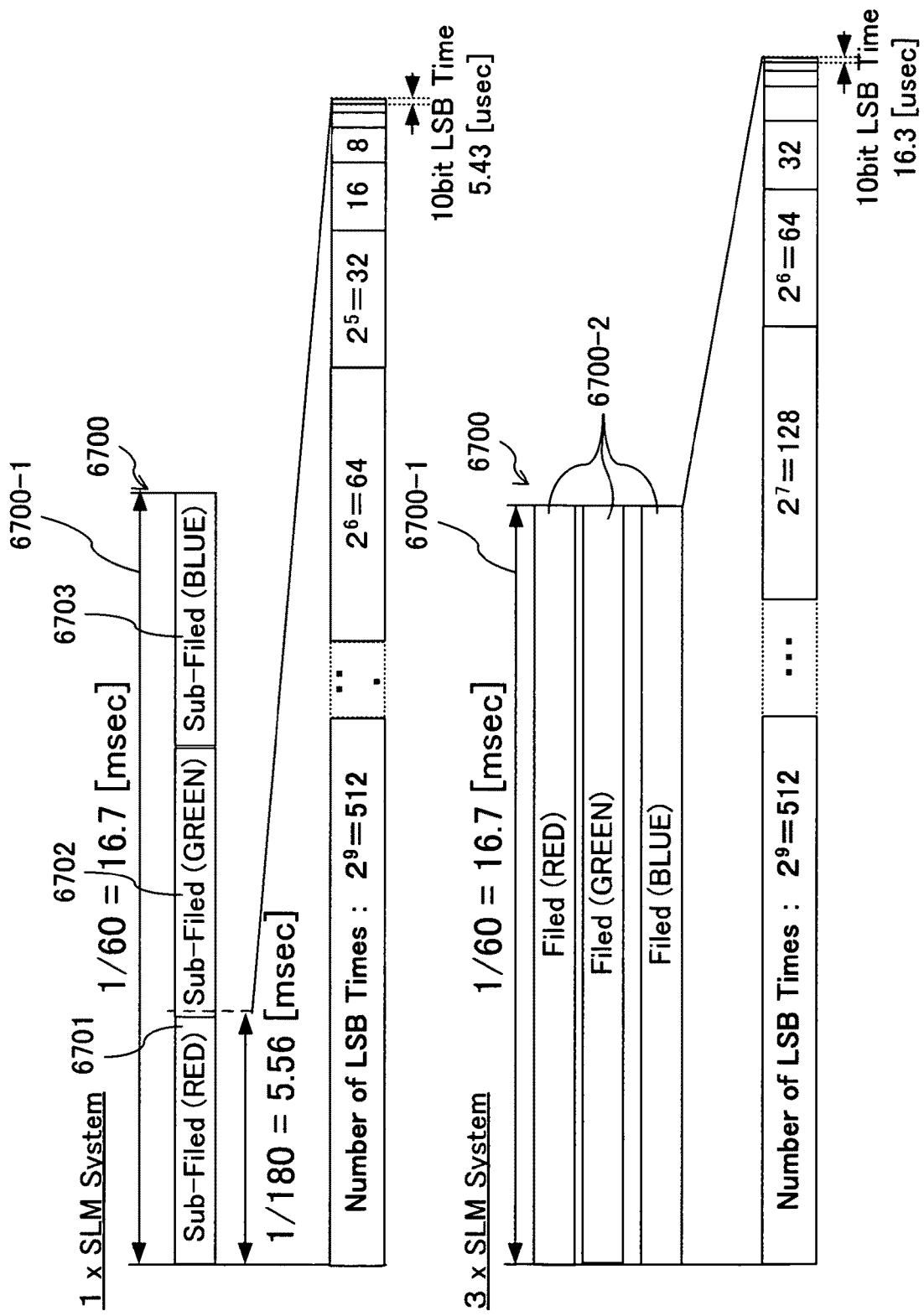
FIG. 15 is a timing diagram showing a data configuration of image data used in a preferred embodiment of the present invention.

According to FIG. 6, the single-panel projection apparatus 5010 (1×SLM); comprising a single SLM receiving one frame of input digital video data 5700 shown as a frame 6700-1 in FIG. 15. The frame 6700-1 in includes a plurality of sub-frames 6701, 6702 and 6703 in a time series corresponding to the respective colors R, G and B. The binary data 6704, or non-binary data 6705, is generated for each subfield as described above.

Furthermore, a multi-panel projection apparatus 5020 (3×SLM) comprising three SLMs receives a control data that includes a plurality of subfields 6700-2, i.e., equivalent to subfields 6701, 6702 and 6703) corresponding to the respective colors R, G and B output simultaneously and in parallel to the respective spatial light modulators 5100. The spatial light modulation for the respective colors are carried out simultaneously and in parallel during the display period of one frame (i.e., a frame 6700-1), as exemplified in the bottom half of FIG. 15.

Furthermore, above-described binary data 6704 or non-binary data 6705 is generated for each subfield 6700-2 of each respective color.

The present embodiment is configured such that the video image analysis unit 5550 of the control unit 5500 detects, from the input digital video data 5700, the timing of a change of the signal waveforms of the binary data 6704 or non-binary data 6705. The control unit 5500 generates a light source profile control signal 6800 for controlling the ON/OFF of the red laser light source 5211, green laser light source 5212 and blue laser light source 5213 of the variable light source 5210, and inputs the signal to the light source control unit 5560 by way of the sequencer 5540.

This configuration implements the ON/OFF control (which is described later) of the variable light source 5210 in sync with the timing of a change in the signal waveforms of the binary data 6704 or non-binary data 6705 of the input digital video data 5700.

Embodiment 3-1

The embodiment shown in FIG. 8A makes it possible to continuously adjust the intensity of emission of the variable light source 5210 while the spatial light modulator 5100 is driven. That is, the embodiment makes it possible to change the brightness of a pixel during the display of an image onto the screen 5900, thereby enabling a control of the gray scale characteristic of the display video image. Further, the present embodiment is configured to adjust the emission intensity of the variable light source 5210 using a drive signal used for driving the spatial light modulator 5100, eliminating extraneous emissions from the variable light source 5210, reducing both the heat emitted and the power consumed.

Embodiment 3-2

Figure 16A:
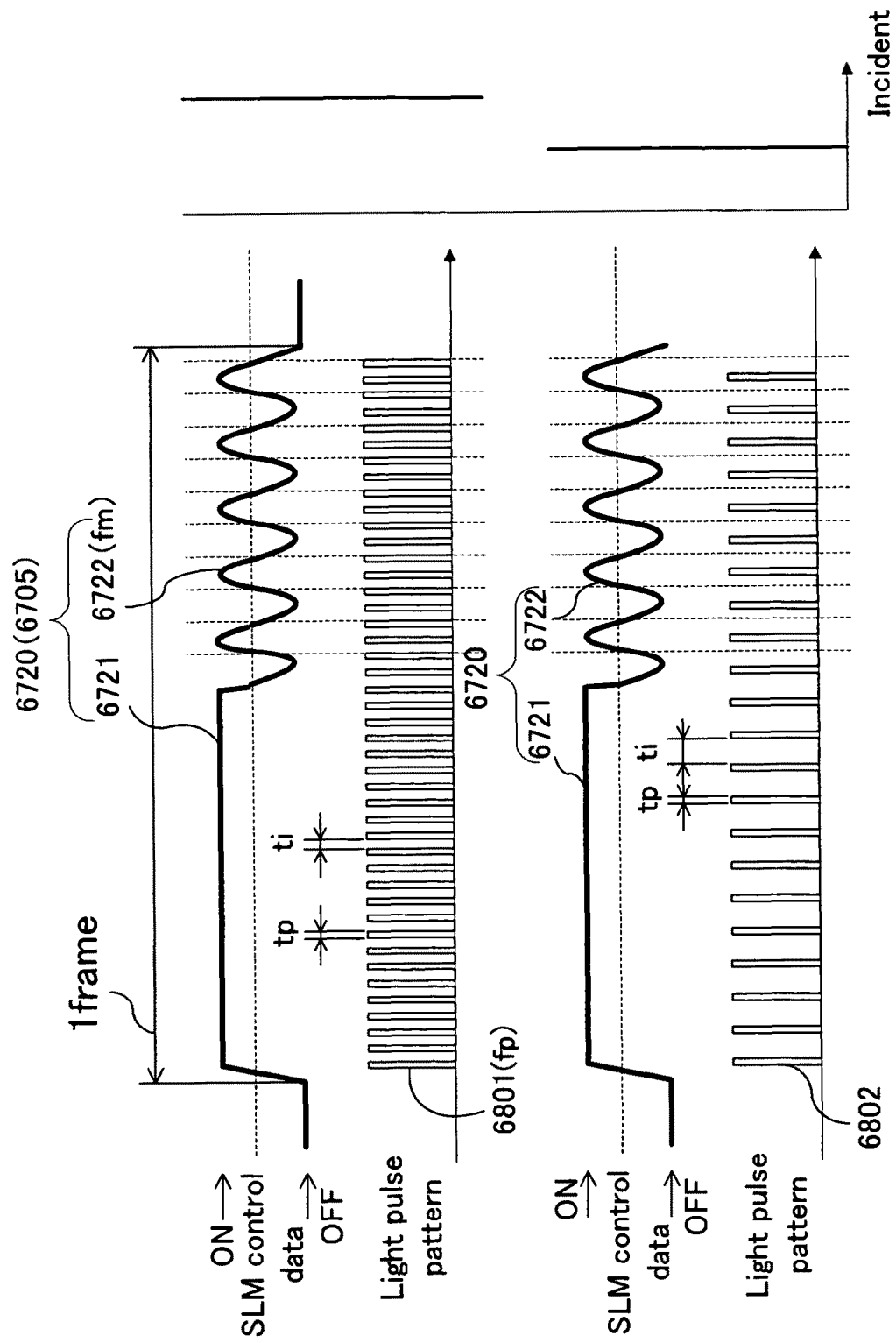
FIG. 16A is a timing diagram for illustrating a control signal of a projection apparatus according to the embodiment of the present invention.

FIG. 16A illustrates an example of the waveform of a mirror control profile 6720 that is a control signal generated from a SLM controller 5530 to a spatial light modulator 5100. FIG. 16A further shows an exemplary waveform of a light source pulse pattern 6801 generated by a light source control unit 5560 from a light source profile control signal 5800, corresponding to the aforementioned mirror control profile 6720. In this case, one frame of the mirror control profile 6720 includes the combination of a mirror ON/OFF control 6721 on the beginning portion of a frame and a mirror oscillation control 6722 near the end portion of the frame period used for controlling the tilting operation of the mirror 5112 corresponding to the gray scale of the present frame.

The mirror ON/OFF control 6721 controls the mirror 5112 in either of the ON and OFF states, and the mirror oscillation control 6722 controls the mirror 5112 in an oscillation state, in which the mirror 5112 oscillates between the ON state and the OFF state.

The present embodiment is configured such that the light source control unit 5560 controls the frequencies of the pulse emission of the variable light source 5210 in accordance with the signal (i.e., mirror control profile 6720) driving the spatial light modulator 5100. The spatial light modulator 5100 performs a modulation of the illumination light 5600 through a spatial light modulation process with the SLM includes a large number of mirrors 5112 corresponding to the pixels to be displayed and the tilting operation of the mirrors 5112.

The mirror oscillation control 6722, the pulse emission frequency fp of the variable light source 5210 emitting the illumination light 5600, is preferably either higher (in the case of the light source pulse pattern 6801 shown in FIG. 16A) by ten times, or more, than the oscillation frequency fp of the oscillation control for the mirror 5112, or lower (in the case of the light source pulse pattern 6802 shown in FIG. 16A) by one tenth, or less, than the frequency fm. The reason is that if the oscillation frequency fm of the mirror 5112 and the pulse emission frequency fp of the variable light source 5210 are close to each other, a humming occurs, which may hamper a correct display of gray scales due to the mirror oscillation control 6722.

Figure 16B:
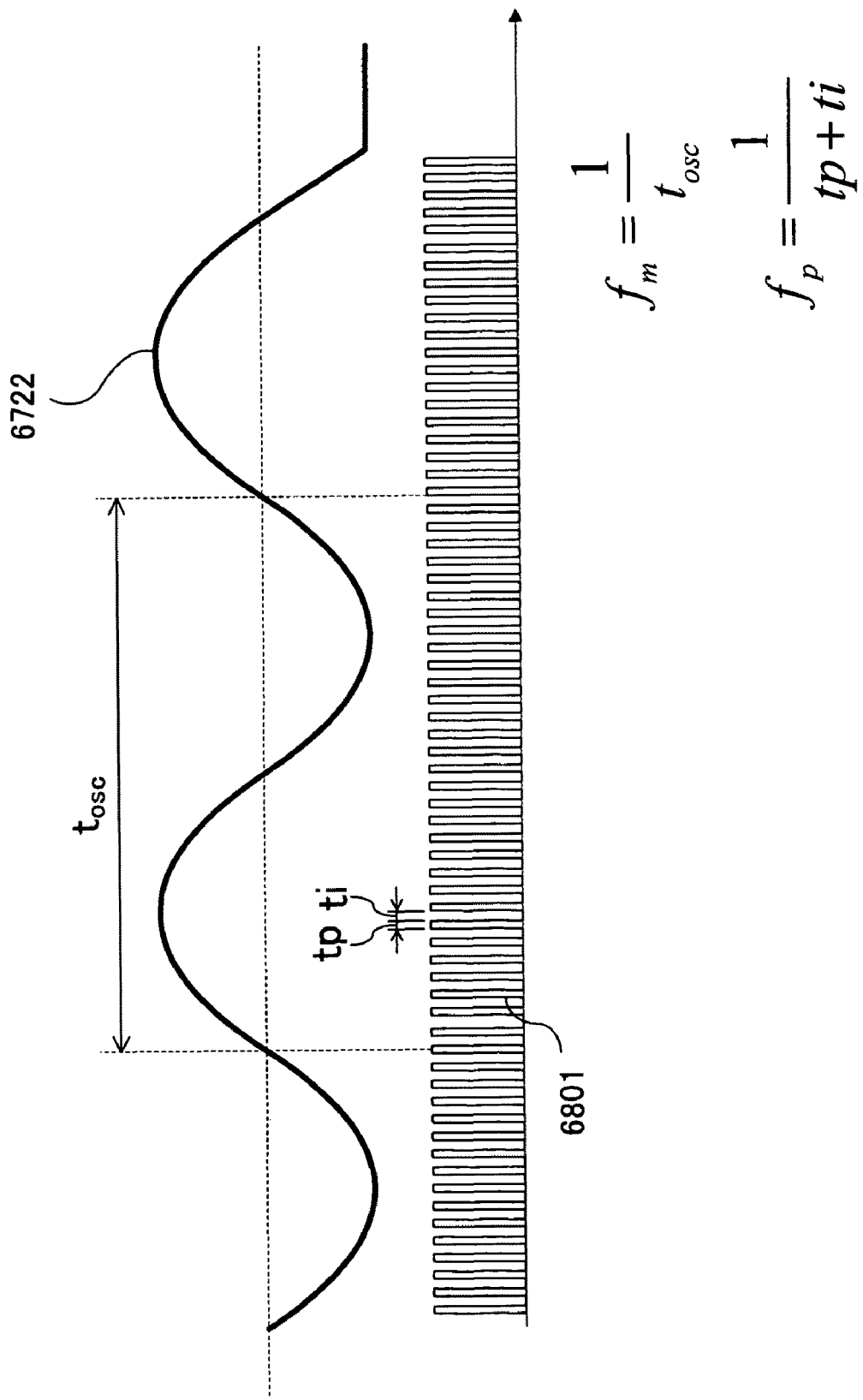
FIG. 16B is a timing for showing a control signal, which is shown by enlarging a part thereof, of a projection apparatus according to the embodiment of the present invention.

FIG. 16B is a timing diagram for showing the above described light source pulse pattern 6801. The top portion shows an expanded waveform corresponding to the mirror oscillation control 6722.

The mirror oscillation control 6722 oscillates at an oscillation cycle $t_{osc}$ (1/fm) and, in contrast the light source pulse pattern 6801, performs pulse emission at a pulse emission frequency fp (1/(tp+ti)) with [emission pulse width tp+emission pulse interval ti] as one cycle. In this case, the condition is: fp>(fm*10)

Therefore, in the example shown in FIG. 16B, there are about 32 pulses of emission from the light source during the oscillation cycle $t_{osc}$ of the mirror oscillation control 6722.

Figure 17:
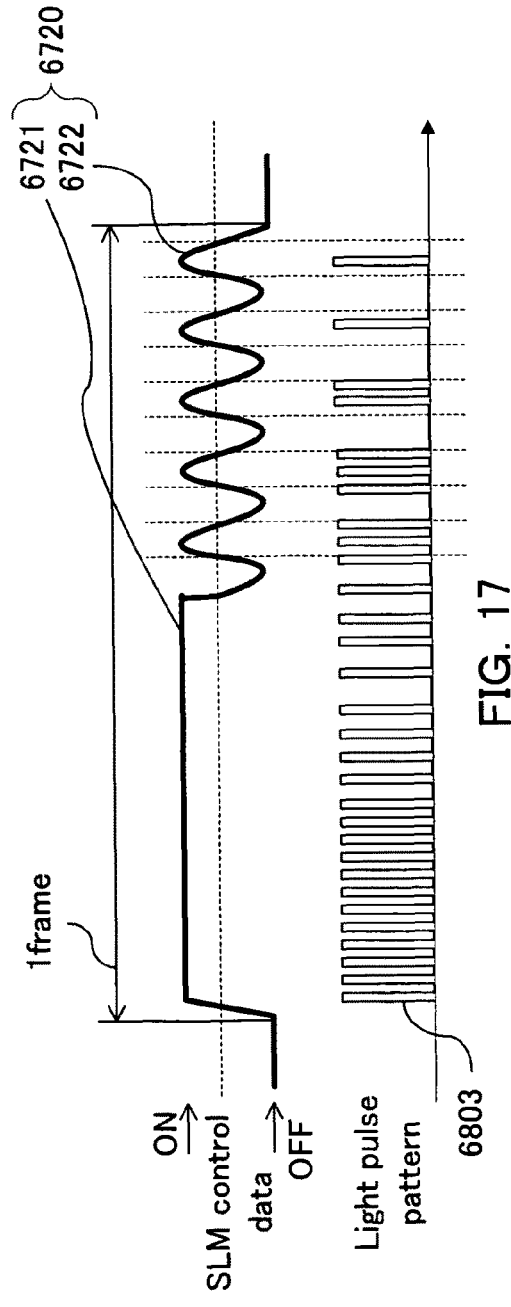
FIG. 17 is a timing diagram for illustrating the control signal of a chirp modulation performed in a projection apparatus according to the embodiment of the present invention.

The present embodiment is configured to change the frequencies of the pulse emission of the variable light source 5210, thereby making it possible to adjust the intensity of the illumination light 5600 emitted FIG. 17 shows a light source pulse pattern 6803 to carry out a chirp modulation, in which the pulse emission frequencies fp of the variable light source 5210 are continuously changed from a high frequency to a low frequency while the spatial light modulator 5100 is driven.

The continuous changing of the pulse emission frequencies fp as exemplified by the light source pulse pattern 6803, makes it possible to extend the number gray scales in the darker parts of an image and thereby allowing the details in the darker part of an image to be displayed without saturating the brighter parts of an image.

Figure 18:
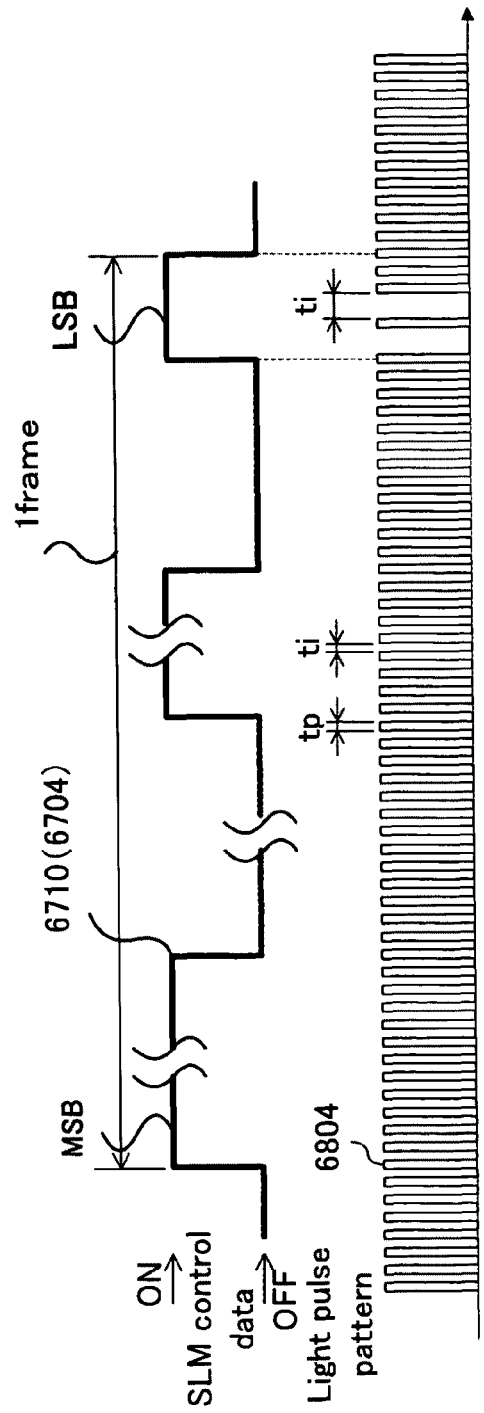
FIG. 18 is a timing diagram for illustrating a control signal using binary data performed in a projection apparatus according to the embodiment of the present invention.

FIG. 18 shows a mirror control profile 6710 controls and drives the spatial light modulator 5100. The mirror control profile 6710 includes binary data 6704 generated by the SLM controller 5530. The pulse emission frequencies fp of the variable light source 5210 are changed during a period corresponding to the LSB of the binary data 6704.

FIG. 18 shows the reduction of the pulse emission frequency fp by increasing an emission pulse interval ti, while keeping the emission pulse width tp fixed in the section of the LSB.

The configuration makes it possible to adjust the light intensity of the light source by changing the pulse emission frequencies fp of the variable light source 5210 in the LSB period. By adjusting the intensity of the light source in the minimum period for driving the mirror 5112 increases the number of bits for controlling the gray scale of the image display.

Figure 19:
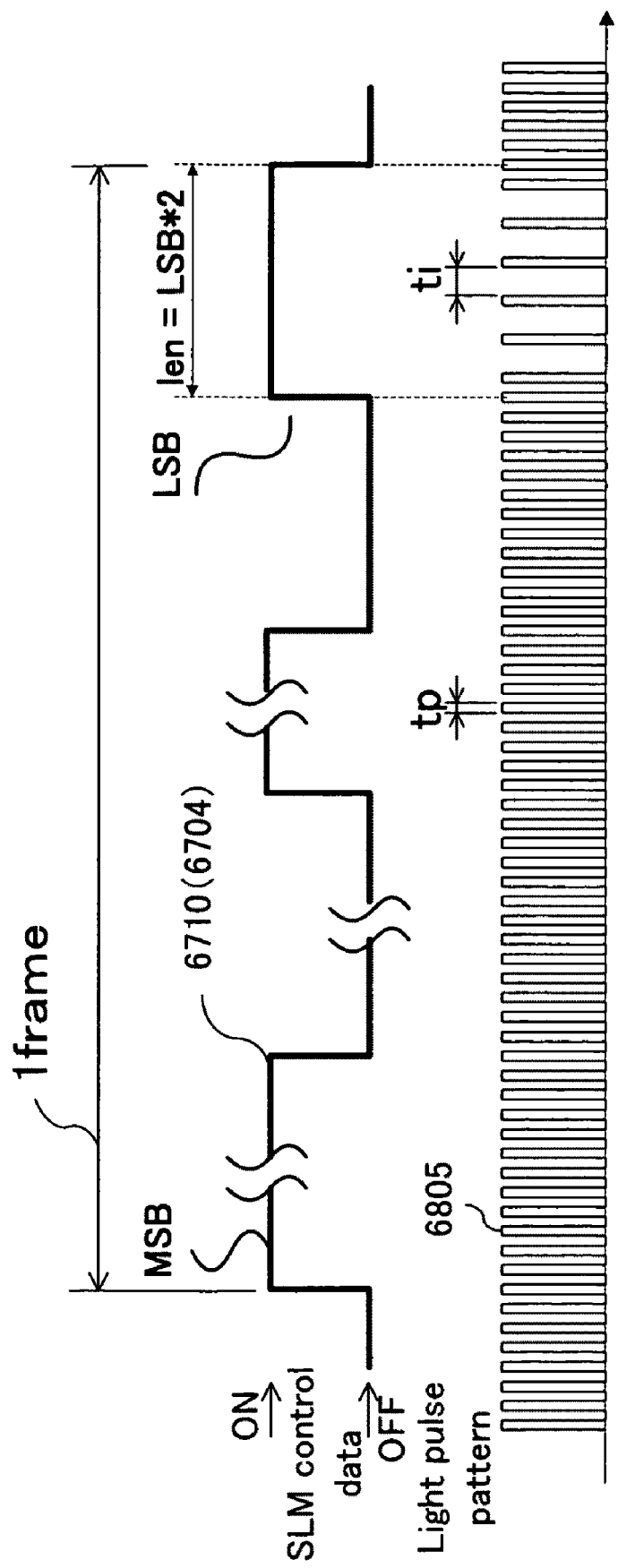
FIG. 19 is another timing diagram for illustrating a control signal using binary data performed in a projection apparatus according to the embodiment of the present invention.

FIG. 19 is a timing diagram for showing a light source pulse pattern 6805. The spatial light modulator 5100 is driven with a mirror control profile 6710 that includes binary data 6704 generated by the SLM controller 5530. Furthermore, the pulse emission frequency fp of the variable light source 5210 is changed to half during the period of the LSB of the mirror control profile 6710.

As described above, by reducing the pulse emission frequency fp of the light source pulse pattern 6805 to half with a time of the LSB period for controlling the mirror control profile 6710. The light intensity of the variable light source 5210 is reduce to 50% and that makes it possible to increase the drive time of the mirror 5112 to two times the LSB period. The use of common light source intensity achieves the same light intensity of the illumination light 5600 as the light intensity obtained during the LSB period.

Accordingly, the period of drive time of the mirror 5112 can be increased to two times the LSB period, and therefore, the control of the spatial light modulator 5100 can be simplified. Alternatively, it is possible to increase the number of bits of gray scales to further increase the resolution of the gray scales for improved image display.

Embodiment 3-3

Figure 20:
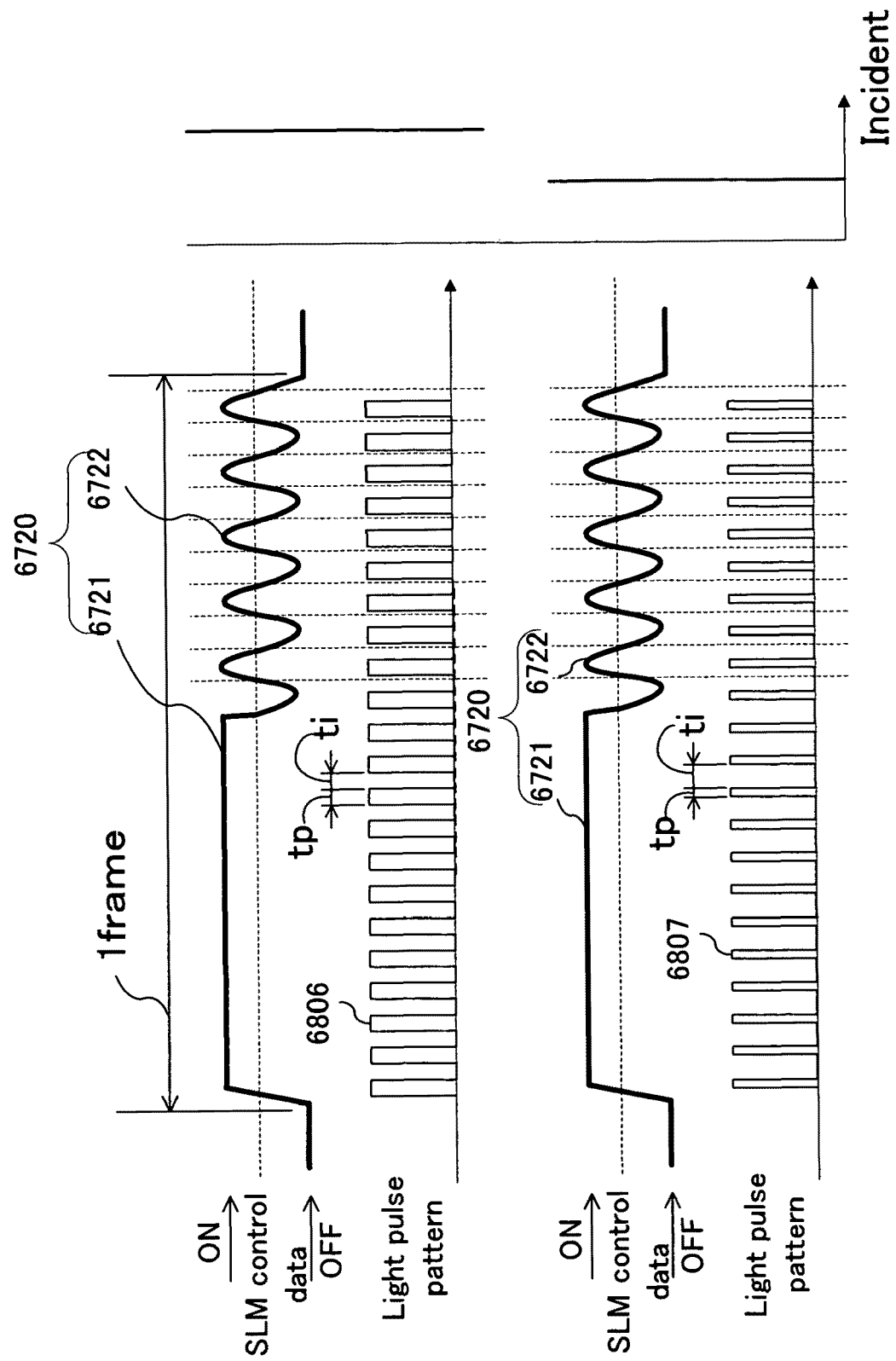
FIG. 20 is a timing diagram for illustrating a control signal, which is shown by enlarging a part thereof, of a projection apparatus according to the embodiment of the present invention.

FIG. 20 is a timing diagram for showing the operation of changing the emission pulse widths tp of the pulse emission of the variable light source 5210 in accord with a signal driving the spatial light modulator 5100.

In this control scheme, the emission pulse width tp is increased as the light source pulse pattern 6806, or alternately decreased as the light source pulse pattern 6807, depending on the mirror control profile 6720 including the mirror ON/OFF control 5721 and mirror control profile 6720.

As described above, by increasing of the emission pulse width tp while keeping the pulse emission frequency fp (tp+ ti=constant) at a fixed value increase the emission intensity of the illumination light 5600 emitted from the variable light source 5210.

The present embodiment is implemented by changing the emission pulse widths tp of the pulse emission of the variable light source 5210. In the meantime, the pulse emission frequency fp is kept at constant, thereby making it possible to adjust the emission intensity of the illumination light 5600, such as a laser light, emitted from the variable light source 5210.

Embodiment 3-4

Figure 21:
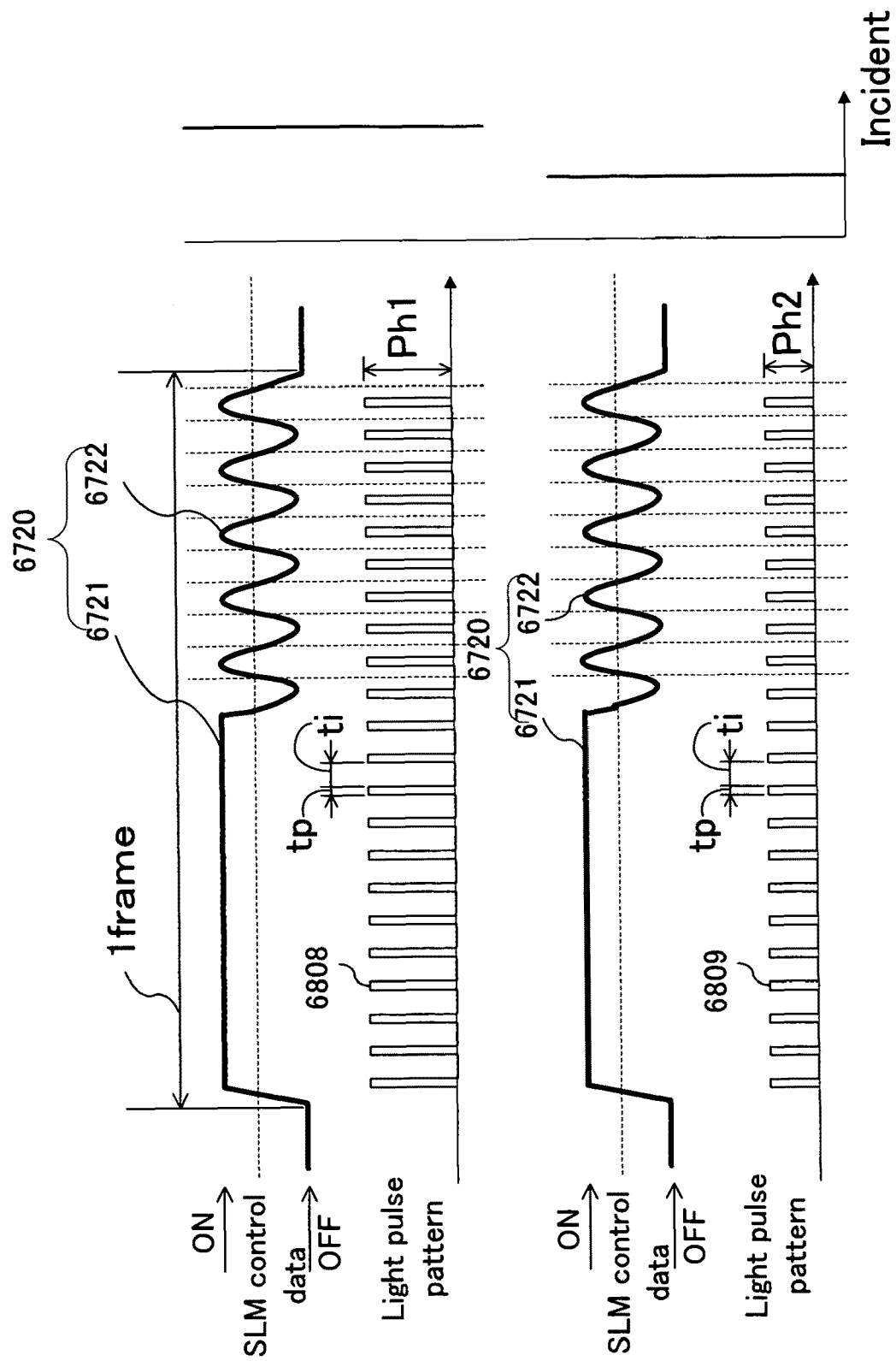
FIG. 21 is a timing diagram for illustrating a control signal of a projection apparatus according to the embodiment of the present invention.

FIG. 21 is a timing diagram for showing the change of the emission light intensities of the emission pulse of the variable light source 5210 in accordance with a mirror control profile 6720 driving the spatial light modulator 5100.

The light source pulse pattern 6808 controls, in sync with the mirror control profile 6720, the emission intensity by using the emission pulse width tp, emission pulse interval ti and emission intensity Ph1.

Further, the light source pulse pattern 6809 controls, in sync with the mirror control profile 6720, the emission intensity by using an emission intensity Ph2 (<emission intensity Ph1) with the emission pulse width tp and emission pulse interval ti held constant.

The present embodiment is configured to change the emission light intensities of the emission pulse, thereby making it possible to adjust the emission intensity of the variable light source 5210, such as a laser.

Embodiment 3-5

Figure 22:
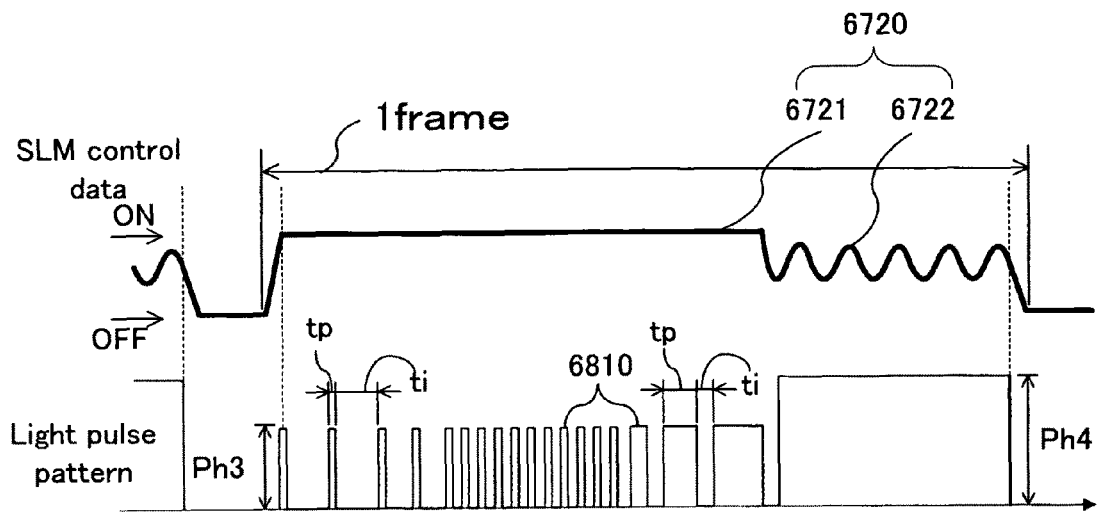
FIG. 22 is another timing diagram for illustrating a control signal of a projection apparatus according to the embodiment of the present invention.

FIG. 22 is a timing diagram for showing the case of changing the emission light intensities using any one of the following parameters: the pulse emission frequency, emission pulse width, emission intensity of a pulse, or a discretionary combination of multiple parameters from among the aforementioned parameters so as to correspond to the mirror control profile 6720 driving the spatial light modulator 5100.

Accordingly, the light source pulse pattern 6810 shown in FIG. 22 illustrates the case of changing the pulse emission frequency fp, emission pulse width tp, emission intensity Ph3 and emission intensity Ph4, in sync with the mirror control profile 6720.

That is, the light source pulse pattern 6810 performs a control such that, in the display period of one frame, first, the pulse emission frequency fp is gradually increased while the emission intensity Ph3 and emission pulse width tp are kept constant and then, in the latter part of the frame, the emission pulse width tp is increased of the section of mirror ON/OFF control 6721.

Further, in the section of mirror oscillation control 6722, the emission intensity is increased to the emission intensity Ph4 (which is larger than the emission intensity Ph3) and the emission pulse width tp is also increased to a value that is equal to the width of the oscillating section 6722.

Controlling the light source pulse pattern 6810 makes it possible to expand the gray scales in, for example, a darker part of a video image, enabling a display of details in a darker part of the image without saturating the brighter parts of the video image.

The present embodiment enables control of the gray scale of a displayed image, by changing the parameters of the pulse emission of the variable light source 5210, such as pulse emission frequency fp, emission pulse width tp, and emission light intensities Ph3 and Ph4.

Embodiment 3-6

Figure 23:
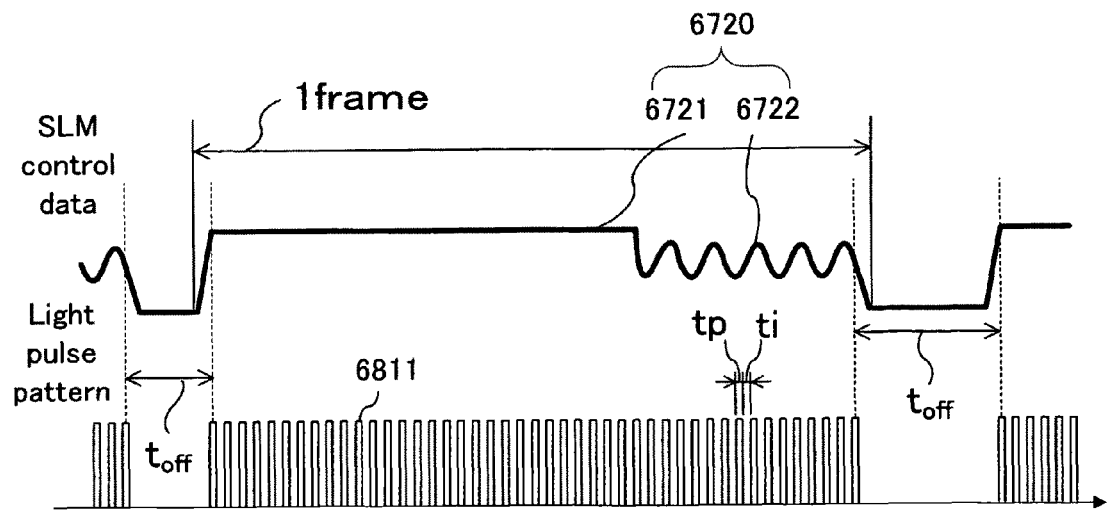
FIG. 23 is another timing diagram for illustrating a control signal of a projection apparatus according to the embodiment of the present invention.

FIG. 23 is another timing diagram for showing the application of the control data for making a variable light source 5210 emit pulses only during the period in which the entire pixels of a spatial light modulator 5100 are driven and suppressing the pulse emission of the variable light source 5210 during the period in which the entire pixels of the spatial light modulator 5100 are not driven.

Accordingly, the light source pulse pattern 6811 shown in FIG. 23 is generated in sync with the mirror control profile 6720, which makes the variable light source 5210 perform pulse emission during the period of driving the mirror 5112 by means of the mirror control profile 6720 and suppressing the pulse emission during the turn-off period $t_{off}$ between frames.

The present embodiment is implemented with the variable light source 5210 emitting light only when the spatial light modulator 5100 is driven. Therefore the power consumption of the projection apparatus and the heat generation of the variable light source 5210 can be reduced.

Embodiment 3-7

Figure 24:
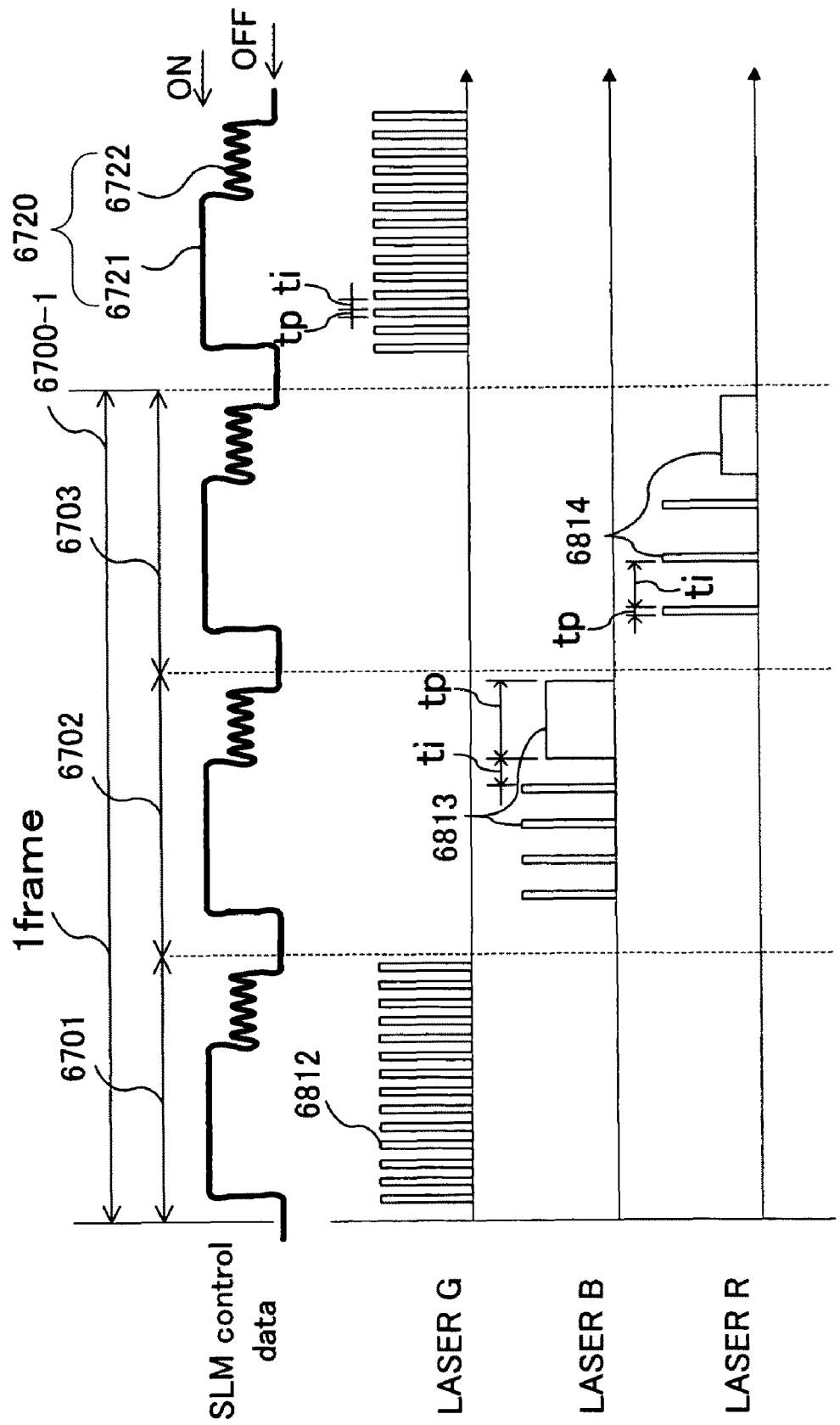
FIG. 24 is another timing diagram for illustrating a control signal of a projection apparatus according to the embodiment of the present invention.

FIG. 24 is a timing diagram for showing the application of the control data for projecting a color display by means of a color sequential control using the control unit 5505, which is exemplified in FIG. 8A, on a single-panel projection apparatus comprising one spatial light modulator 5100 as exemplified in the above described FIG. 6.

The display period of one frame (i.e., frame 6700-1) is further divided, in a time series, to the subfields 6701, 6702 and 6703, corresponding to the respective colors G, R and B.

Then, the pulse emission of the green laser light source 5212 is controlled in accordance with a light source pulse pattern 6812 in the green (G) subfield 6701; the pulse emission of the red laser light source 5211 is controlled in accordance with a light source pulse pattern 6813 in the red (R) subfield 6702; and the pulse emission of the blue laser light source 5213 is controlled in accordance with a light source pulse pattern 6804.

As described above, the light source drive circuit 5570 performs a control in order to adjust the emission light intensities for the red laser light source 5211, green laser light source 5212 and blue laser light source 5213 of the respective colors R, G and B in accordance with the mirror control profile 6720 generated by the SLM controller 5530.

The present embodiment makes it possible to expand the gray scale of the respective colors R, G and B in a color display on a color sequential projection apparatus.

Embodiment 3-8

Figures 25A, 25B:
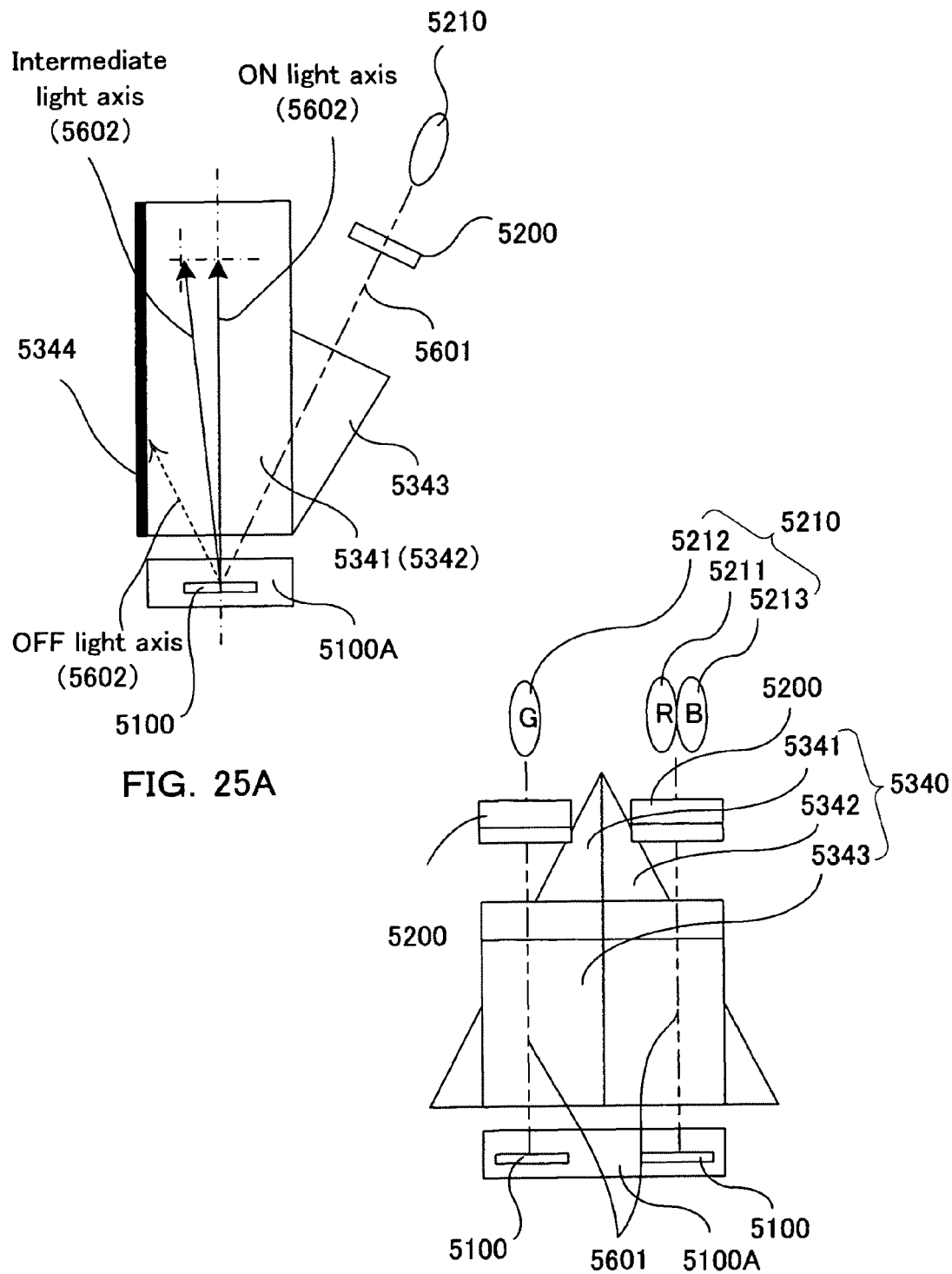
FIG. 25A is a side cross sectional view of the synthesis optical system of a projection apparatus according to the embodiment of the present invention.
FIG. 25B is a front view of the synthesis optical system of a projection apparatus according to the embodiment of the present invention.

FIGS. 25A and 25B are functional block diagrams which, taken together, show the configuration of the optical system of a projection apparatus comprising a plurality of spatial light modulators 5100.

FIG. 25A is a side view of a synthesis optical system according to the present embodiment; FIG. 25B is the front view diagram.

The optical system according to the present embodiment comprises a device package 5100A, which integrates a plurality of spatial light modulators 5100, a color synthesis optical system 5340, a light source optical system 5200, and a variable light source 5210.

The plurality of spatial light modulators 5100 incorporated in the device package 5100A is fixed in a position in which the rectangular contour of the spatial light modulator 5100 is inclined at approximately 45 degrees, on a horizontal plane, relative to each side of the device package 5100A, which has a similarly contoured rectangular shape.

The color synthesis optical system 5340 is placed on the device package 5100A.

The color synthesis optical system 5340 is comprised of right-angle triangle pole-shaped prisms 5341 and 5342, which are joined together to form an equilateral triangle column on the longitudinal side, and a right-angle triangle column-shaped light guide block 5343. A sloped surface of the light guide block 5343 is attached, with adhesives, to the side faces of prisms 5341 and 5342, with the bottom surface of the light guide block 5343 facing up.

On the prisms 5341 and 5342, a light absorption body 5344 is placed on the surface of the side opposite to the side on which the light guide block 5343 is adhesively attached.

The bottom of the light guide block 5343 is equipped with the light source optical system 5200 of the green laser light source 5212, and the light source optical system 5200 of the red laser light source 5211 and blue laser light source 5213, with the optical axis of each of the light source optical systems 5200 maintained in a vertical position.

Further, the illumination light 5600 emitted from the green laser light source 5212 is incident to the spatial light modulator 5100, on one side, which is positioned immediately under the prism 5341, as incident light 5601, by way of the light guide block 5343 and the present (??) prism 5341.

Also, the illumination lights 5600 respectively emitted from the red laser light source 5211 and the blue laser light source 5213 are incident to the spatial light modulator 5100, on the other side, which is positioned immediately under the prism 5342, as the incident light 5601, by way of the light guide block 5343 and the prism 5342.

The red and blue incident lights 5601, incident to the spatial light modulator 5100, are reflected vertically upward, as reflection lights 5602, in the prism 5342 and are further reflected by the external surface and adhesively attached surface, in this order, of the prism 5342; they are then incident to the projection optical system 5400 and reflected as the projection light 5603, in the ON state of a mirror 5112.

Meanwhile, the green incident light 5601, incident to the spatial light modulator 5100, is reflected in the vertically upward direction as a reflection light 5602 in the prism 5341, is further reflected by the external surface of the prism 5341, follows the same light path as the red and blue reflection lights 5602, and is incident to the projection optical system 5400, in which the incident light becomes the projection light 5603, in the ON state of the mirror 5112.

As described above, the mirror device according to the present embodiment is configured to accommodate at least two modules of spatial light modulators 5100 in a single device package 5100A. One module is illuminated only with the incident light 5601 from the green laser light source 5212. The other module of the spatial light modulator 5100 is illuminated with the incident light 5601 from either or both of the red laser light source 5211 or blue laser light source 5213. Individual modulation lights respectively modulated by two spatial light modulators 5100 are collected at the color synthesis optical system 5340 as described above. The collected light is further expanded by the projection optical system 5400 and projected onto the screen 5900, or the like, as the projection light 5603.

Figure 26:
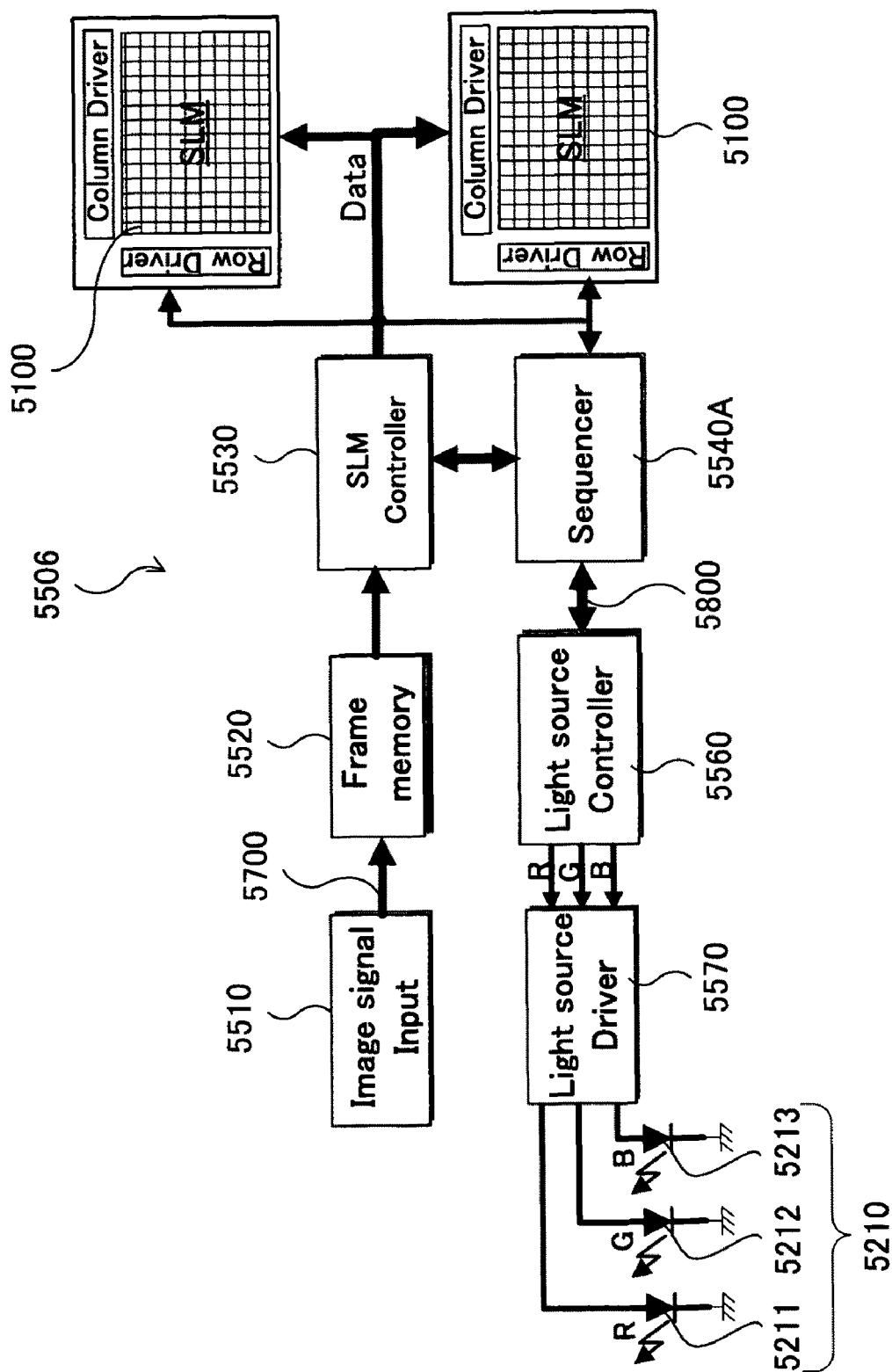
FIG. 26 is a block diagram for showing the configuration of a control unit of a projection apparatus according to the embodiment of the present invention.

FIG. 26 is a block diagram for showing the configuration of a control unit 5506 situated in the projection apparatus, configured as exemplified in the above described FIGS. 25A and 25B.

Figure 27:
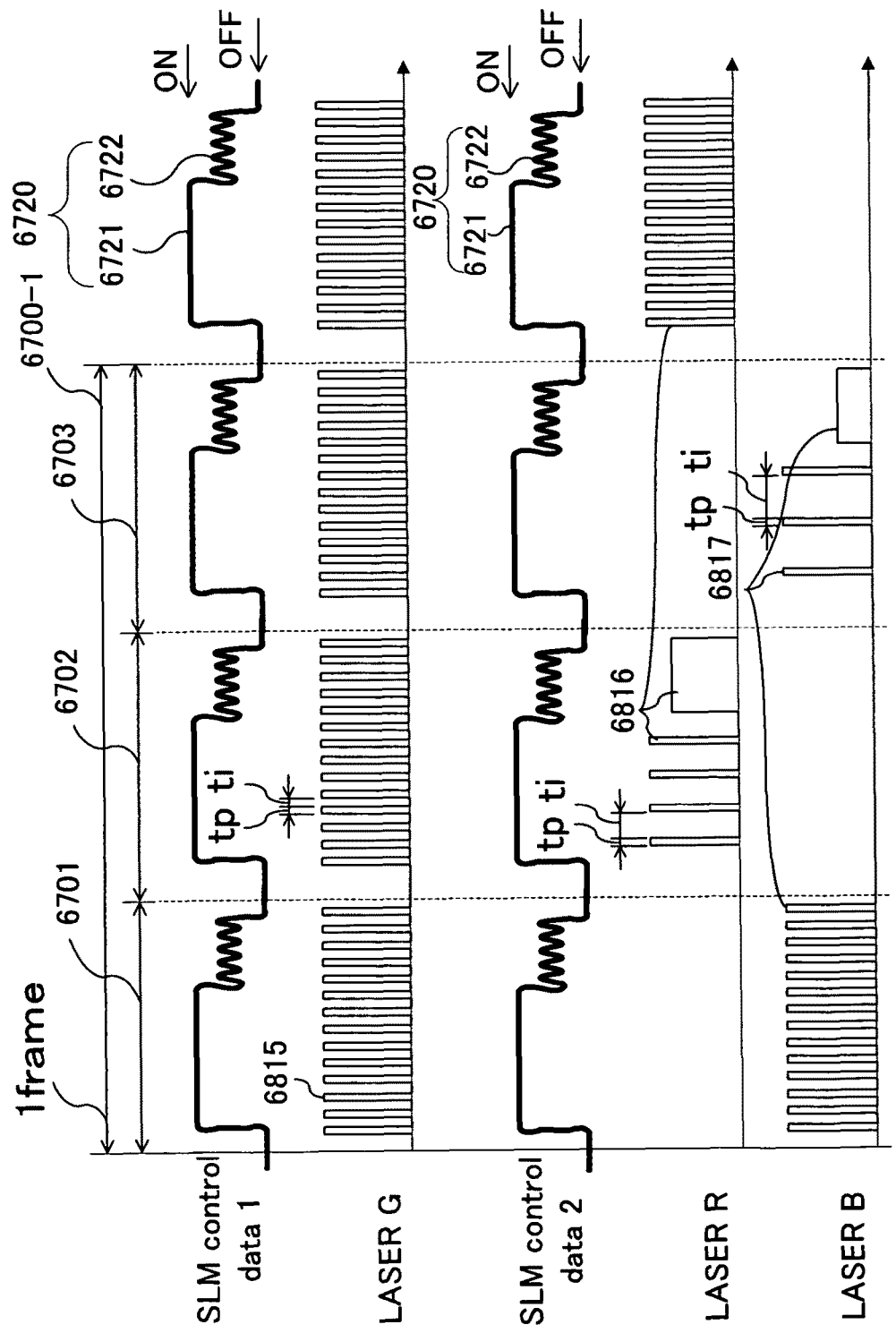
FIG. 27 is a timing diagram for illustrating the waveform of a control signal of a projection apparatus according to the embodiment of the present invention.

FIG. 27 is a timing diagram for showing the waveform of a control signal of the projection apparatus, according to the present embodiment 3-8.

A drive signal (i.e., the mirror control profile 6720 shown in FIG. 27) generated by the SLM controller 5530 drives the plurality of spatial light modulators 5100 packaged in the device package 5100A.

The light source control unit 5560 generates a light source profile control signal 5800 corresponding to the mirror control profile 6720 that is the signal driving the respective spatial light modulators 5100 and inputs the generated profile 6720 into the light source drive circuit 5570, which in turn adjusts the intensity of the laser lights (i.e., the illumination lights 5600) emitted, respectively, from the red laser light source 5211, green laser light source 5212 and blue laser light source 5213.

The control unit 5506 of the projection apparatus according to the present embodiment 3-8 is configured such that one SLM controller 5530 drives a plurality of spatial light modulators 5100. The illumination lights 5600 is provided to project lights to the respective spatial light modulators 5100 with the most optimal intensity without requiring the individual spatial light modulators 5100 to include a light source control unit 5560 or light source drive circuit 5570. This configuration simplifies the circuit configuration of the control unit 5506.

FIG. 27 is a timing diagram for showing the control signals of the light source control unit 5560 and light source drive circuit 5570 drive the red laser light source 5211, green laser light source 5212 and blue laser light source 5213 so as to adjust the emission intensities of the individual lasers (i.e., the illumination light 5600) of the respective colors R, G and B in sync with the respective SLM drive signal (i.e., the mirror control profile 6720) that are generated by the SLM controller 5530.

Therefore, a color sequence control is employed for modulating and displaying the two colors B and R sharing one spatial light modulator 5100.

One frame includes a plurality of subfields 6701, 6702 and 6703, and the same light source pulse pattern 6815 is repeated in the respective subfields for one spatial light modulator 5100 corresponding to green (G).

Meanwhile, for the modulations of the red (R) and blue (B), which share one spatial light modulator 5100, the pulse emissions of the red laser light source 5211 and blue laser light source 5213 are controlled by using the control signals generated from the subfields, i.e., subfields 6701 through 6703 alternately in a time series as indicated by the light source pulse patterns 6816 and 6817, respectively.

The present embodiment makes it possible to increase the gray scale levels for each of different colors including the colors of R, G and B.

Note that the present invention can be modified in various ways within the scope of the present invention and is not limited to the configurations exemplified in the above-described preferred embodiments.

Although the present invention has been described in terms of the presently preferred embodiment, it is to be understood that such disclosure is not to be interpreted as limiting. Various alternations and modifications will no doubt become apparent to those skilled in the art after reading the above disclosure. The present invention may be changed in various manners possible within the scope of the present invention, and is not limited to the configurations exemplified in the above-described embodiments. Accordingly, it is intended that the appended claims be interpreted as covering all alternations and modifications as fall within the true spirit and scope of the invention.

What is claimed is:

1. A projection apparatus, comprising:
a light source for emitting illumination light;
at least one spatial light modulator with a plurality of movable mirrors corresponding to pixels to be displayed, for performing a modulation of the illumination light through operation of the movable mirrors;
a light source control unit performing a modulation control of the light source; and
a spatial light modulator control unit generating, from an input image signal, a control signal for driving the spatial light modulator, wherein the light source control unit controls a pulse emission frequency of an emission pulse of the illumination light emitted from the light source by adjusting the pulse emission frequency of the illumination light emitted from the light source to be ten times the oscillation frequency of the movable mirrors or higher.

2. A projection apparatus comprising:
a light source for emitting illumination light;
at least one spatial light modulator with a plurality of movable mirrors corresponding to pixels to be displayed, for performing a modulation of the illumination light through operation of the movable mirrors; and
a light source control unit performing a modulation control of the light source; and
a spatial light modulator control unit generating, from an input image signal, a control signal for driving the spatial light modulator, wherein the light source control unit controls a pulse emission frequency of an emission pulse of the illumination light emitted from the light source by adjusting the pulse emission frequency of the illumination light emitted from the light source to be one-tenth the oscillation frequency of the movable mirrors or lower.

3. The projection apparatus according to claim 1, wherein:
the light source control unit drives the light source by changing a pulse width of the emission pulse.

4. The projection apparatus according to claim 1, wherein:
the light source control unit drives the light source by changing a pulse intensity of the emission pulse.

5. The projection apparatus according to claim 1, wherein:
the light source is a laser diode or a light emitting diode (LED).

6. The projection apparatus according to claim 1, wherein:
the movable mirrors have an ON state of reflecting, to a projection optical system, the illumination light emitted from the light source, an OFF state of reflecting the illumination light to a position that is offset from the projection optical system, and an oscillation state in which the movable mirrors oscillate between the ON state and the OFF state.

7. A projection apparatus comprising:
a light source for emitting illumination light;
at least one spatial light modulator with a plurality of movable mirrors corresponding to pixels to be displayed, for performing a modulation of the illumination light through operation of the movable mirrors;
a light source control unit performing a modulation control of the light source; and
a spatial light modulator control unit generating, from an input image signal, a control signal for driving the spatial light modulator, wherein the light source control unit controls a pulse emission frequency of an emission pulse of the illumination light emitted from the light source corresponding to an oscillation frequency of the movable mirrors; and
the light source control unit performs a control by stopping an emission of the light source during a period other than a period during a period when the control signal generated by the spatial light modulator control unit drives the spatial light modulator.

8. The projection apparatus according to claim 1, comprising:
a plurality of the light sources respectively corresponding to at least red (R), green (G), and blue (B), wherein the light source control unit independently drives the light sources of R/G/B.

9. The projection apparatus according to claim 1, comprising:
the light sources of at least red (R) green (G), and blue (B), wherein:
the light source control unit performs a drive so that the spatial light modulator control unit adjusts an emission intensity of the illumination light for the light source of each of R/G/B synchronously with the control signal generated by the spatial light modulator control unit.

10. The projection apparatus according to claim 1, comprising:
a plurality of the spatial light modulators, wherein the spatial light modulator control unit generates the control signal for driving the plurality of spatial light modulators; and
the light source control unit receives the control signal for driving each of the spatial light modulators, and adjusts an emission intensity of the illumination light emitted from the light sources to the spatial light modulators.

11. A projection apparatus, wherein:
a light source for emitting illumination light;
at least one spatial light modulator with a plurality of movable mirrors corresponding to pixels to be displayed, for performing a modulation of the illumination light through operation of the movable mirrors;
a light source control unit performing a modulation control of the light source; and
a spatial light modulator control unit generating, from an input image signal, a control signal for driving the spatial light modulator, wherein:
the light source control unit controls a pulse emission frequency of an emission pulse of the illumination light emitted from the light source so that the pulse emission frequency is ten times an oscillation frequency of the movable mirrors or higher.

12. The projection apparatus according to claim 11, wherein:
the light source control unit drives the light source so as to change a pulse width of the emission pulse.

13. The projection apparatus according to claim 11, wherein:
the light source control unit drives the light source so as to change a pulse intensity of the emission pulse.

14. The projection apparatus according to claim 11, wherein:
the light source is a laser diode or a light emitting diode (LED).

15. The projection apparatus according to claim 11, wherein:
the movable mirrors have an ON state of reflecting, to a projection optical system, the illumination light emitted from the light source, an OFF state of reflecting the illumination light to a position that is offset from the projection optical system, and an oscillation state in which the movable mirrors oscillate between the ON state and the OFF state.

16. A projection apparatus, comprising:
a light source for emitting illumination light;
at least one spatial light modulator with a plurality of movable mirrors corresponding to pixels to be displayed, for performing a modulation of the illumination light through operation of the movable mirrors;
a light source control unit performing a modulation control of the light source; and
a spatial light modulator control unit generating, from an input image signal, a control signal for driving the spatial light modulator, wherein:
the light source control unit controls a pulse emission frequency of an emission pulse of the illumination light emitted from the light source so that the pulse emission frequency is one-tenth an oscillation frequency of the movable mirrors or lower.

17. The projection apparatus according to claim 16, wherein:
the light source control unit drives the light source so as to change a pulse width of the emission pulse.

18. The projection apparatus according to claim 16, wherein:
the light source control unit drives the light source so as to change a pulse intensity of the emission pulse.

19. The projection apparatus according to claim 16, wherein:
the light source is a laser diode or a light emitting diode (LED).

20. The projection apparatus according to claim 16, wherein:
the movable mirrors have an ON state of reflecting, to a projection optical system, the illumination light emitted from the light source, an OFF state of reflecting the illumination light to a position that is offset from the projection optical system, and an oscillation state in which the movable mirrors oscillate between the ON state and the OFF state.

21. The projection apparatus according to claim 1, wherein:
the light source control unit performs a control by stopping an emission of the light source during a period other than a period during a period when a control signal generated by the spatial light modulator control unit drives the spatial light modulator.

22. A projection apparatus, comprising:
a light source for emitting illumination light;
at least one spatial light modulator with a plurality of movable mirrors corresponding to pixels to be displayed, for performing a modulation of the illumination light through operation of the movable mirrors;
a light source control unit performing a modulation control of the light source; and
a spatial light modulator control unit generating, from an input image signal, a control signal for driving the spatial light modulator, wherein the light source control unit controls a pulse emission frequency of an emission pulse of the illumination light emitted from the light source by adjusting the pulse-width of the illumination light emitted from the light source to be ten times or greater than a minimum period of an ON-time of the movable mirrors.

23. The projection apparatus according to claim 22, wherein:
the light source control unit performs a control by stopping an emission of the light source during a period other than a period during a period when the control signal generated by the spatial light modulator control unit drives the spatial light modulator.

24. The projection apparatus according to claim 22, wherein:
the minimum period of the ON-time is a period controlled by a least significant bit (LSB) of a control signal received by the spatial light modulator to control the movable mirrors.

25. The projection apparatus according to claim 22, wherein:
the spatial light modulator applies a pulse-width modulation (PWM) process to control the movable mirrors.

26. The projection apparatus according to claim 22, wherein:
the light source control unit drives the light source by changing a pulse width of the emission pulse.

27. The projection apparatus according to claim 22, wherein:
the light source control unit drives the light source by changing a pulse intensity of the emission pulse.

28. The projection apparatus according to claim 22, wherein:
the light source is a laser diode or a light emitting diode (LED).

29. A projection apparatus, comprising:
a light source for emitting illumination light;
at least one spatial light modulator with a plurality of movable mirrors corresponding to pixels to be displayed, for performing a modulation of the illumination light through operation of the movable mirrors;
a light source control unit performing a modulation control of the light source; and
a spatial light modulator control unit generating, from an input image signal, a control signal for driving the spatial light modulator, wherein the light source control unit controls a pulse emission frequency of an emission pulse of the illumination light emitted from the light source by adjusting the pulse-width of the illumination light emitted from the light source to be one-tenth or less than a minimum period of an ON-time of the movable mirrors.

30. The projection apparatus according to claim 29, wherein:
the light source control unit performs a control by stopping an emission of the light source during a period other than a period during a period when the control signal generated by the spatial light modulator control unit drives the spatial light modulator.

31. The projection apparatus according to claim 29, wherein:
   the minimum period of the ON-time is a period controlled by a least significant bit (LSB) of a control signal received by the spatial light modulator to control the movable mirrors.

32. The projection apparatus according to claim 29, wherein:
   the spatial light modulator applies a pulse-width modulation (PWM) process to control the movable mirrors.

* * * * *